US007710073B2

(12) United States Patent
Yamauchi et al.

(10) Patent No.: US 7,710,073 B2
(45) Date of Patent: May 4, 2010

(54) SECONDARY BATTERY MODULE, BATTERY INFORMATION MANAGEMENT DEVICE, BATTERY INFORMATION MANAGEMENT SYSTEM, SECONDARY BATTERY REUSE SYSTEM, SECONDARY BATTERY RECOVERY AND SALES SYSTEM, SECONDARY BATTERY REUSE METHOD, AND SECONDARY BATTERY RECOVERY AND SALES METHOD

(75) Inventors: Shuko Yamauchi, Hitachi (JP); Youhei Kawahara, Hitachi (JP); Akihiko Emori, Hitachi (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 479 days.

(21) Appl. No.: 11/598,663

(22) Filed: Nov. 14, 2006

(65) Prior Publication Data
US 2007/0108946 A1    May 17, 2007

(30) Foreign Application Priority Data
Nov. 14, 2005   (JP)   .............................. 2005-329200

(51) Int. Cl.
*H02J 7/00* (2006.01)
*H02J 7/04* (2006.01)
*H02J 7/16* (2006.01)

(52) U.S. Cl. ...................... 320/128; 320/132; 320/134; 320/162

(58) Field of Classification Search ................. 320/132, 320/128
See application file for complete search history.

(56) References Cited

U.S. PATENT DOCUMENTS 6,184,656 B1 * 2/2001 Karunasiri et al. .......... 320/119
6,983,212 B2 * 1/2006 Burns .......................... 702/63

FOREIGN PATENT DOCUMENTS

JP      2004-126669     4/2004
WO      WO 00/77911     12/2000

OTHER PUBLICATIONS

Penttila et al, "Performance Development of a High-Speed Automatic Object Identification Using Passive RFID Technology", Robotics and Automation, 2004. Proceedings. ICRA '04. 2004 IEEE International Conference on New Orleans, LA, USA Apr. 26-May 1, 2004, Piscataway, NJ, vol. 5, Apr. 26, 2004, pp. 4864-4868, p. 1, right-hand column, last paragraph.

* cited by examiner

*Primary Examiner*—Edward Tso
*Assistant Examiner*—Ahmed Omar
(74) *Attorney, Agent, or Firm*—Antonelli, Terry, Stout & Kraus, LLP.

(57) ABSTRACT

A secondary battery module includes a battery information storage unit for storing electric characteristic information and usage history information of the secondary battery module. A battery information management device and a terminal device respectively include interfaces to be connected to the secondary battery module. The battery information management device is provided with a battery information database. The battery information management device is connected to the terminal device through a communications network. In this way, battery information stored in the battery information storage unit, which is acquired by the battery information management device and the terminal device, is accumulated in the battery information database. Moreover, the battery information management device grades the secondary battery module for reuse based on the battery information and a predetermined threshold.

5 Claims, 10 Drawing Sheets

SECONDARY BATTERY MODULE, BATTERY INFORMATION MANAGEMENT DEVICE, BATTERY INFORMATION MANAGEMENT SYSTEM, SECONDARY BATTERY REUSE SYSTEM, SECONDARY BATTERY RECOVERY AND SALES SYSTEM, SECONDARY BATTERY REUSE METHOD, AND SECONDARY BATTERY RECOVERY AND SALES METHOD

BACKGROUND OF THE INVENTION

1. Field of the Invention

The present invention relates to a secondary battery module, a battery information management device, a battery information management system, a secondary battery reuse system, a secondary battery recovery and sales system, a secondary battery reuse method, and a secondary battery recovery and sales method, which are suitable for a vehicle or an industrial application.

2. Description of the Related Art

Global environmental issues are currently becoming major concerns and zero-emission techniques and recycle techniques are drawing attentions. In particular, the way how to recycle a rechargeable battery that contains heavy metal such as nickel or lead is a major problem among the environmental issues. Meanwhile, carbon dioxide emissions-reduction has been urged in every place to prevent global warming, and substitution of hybrid electric vehicles (HEVs) or pure electric vehicles (PEVs) for gasoline-engine-driven vehicles that are major sources of carbon dioxide emissions has begun.

As of now, large-sized secondary batteries including a nickel-metal hydride battery, a lead-acid battery and a lithium secondary battery are used as electric sources for driving hybrid electric vehicles or pure electric vehicles. Meanwhile, in the case of using a next-generation hydrogen fuel cell battery as a main power source, it is likely that the secondary batteries such as the nickel-metal hydride battery or the lithium battery will be used as auxiliary power. Accordingly, a demand for the large-sized secondary batteries is expected to increase in the future, and concurrently, a quantity of secondary batteries that become unrechargeable and are disposed of is also expected to increase rapidly. Therefore, construction of a secondary battery recycle system is an urgent issue.

In this specification, batteries that are capable of charging and discharging electricity for multiple times will be generically referred to as "secondary batteries." In this case, the secondary batteries may also include capacitor (condenser) type electric devices such as electric double layer capacitors. To be more precise, the secondary batteries include what is termed as "secondary batteries" such as the lead-acid battery, the nickel-metal hydride battery, the lithium-ion battery, the lithium secondary battery and a nickel cadmium battery, and capacitor-type electrochemical devices such as an aqueous electric double layer capacitor and a nonaqueous electric double layer capacitor. Moreover, in this specification, the lithium secondary battery means a battery which is not only dischargeable but also chargeable by use of Li ions. The lithium secondary battery includes a lithium-ion battery composed of a cathode active material and an anode active material which allow insertion and desorption of Li ions and an electrolyte containing Li ions.

The large-sized secondary battery as represented by an electric source for driving a hybrid electric vehicle or a pure electric vehicle is required to have a high output or a high capacity. Accordingly, the number of cell series increases inside a battery module that constitutes such a secondary battery. The size may become as huge as 15 liters or even more. Table 1 shows some examples of large-sized secondary batteries.

TABLE 1

|  | Lithium secondary battery | Nickel-metal hydride battery | Lead-acid battery | Electric double layer capacitor |
|---|---|---|---|---|
| Cell voltage (V) | 3.6 | 7.2 | 2 | 2.7 |
| Assembled battery voltage (V) | 173 | 201 | 24 | 54 |
| Capacity | 5 (Ah) | 6.5 (Ah) | 83 (Ah) | 65 (F) |
| Size (dm$^3$) | 22.5 | 46 | 132 | 5.6 |
| Weight (kg) | 20 | 51 | 226 | 6.6 |
| Energy (Wh) | 865 | 1306 | 1992 | 53 |
| Energy density (Wh/kg) | 43.3 | 25.6 | 8.8 | 8.0 |

These batteries require high performances in lifetime as well as output, and therefore consume large amounts of high-functional and expensive materials. Accordingly, there is a strong demand, in particular for reduction in product prices, and moreover, for reduction in disposal quantity with regard to large-sized secondary batteries in particular to reduce product prices, and moreover, to reduce disposal quantity. In other words, to reduce product prices of secondary batteries and to make effective use of resources, it is vital to establish techniques for making effective use of secondary batteries, including a recycling technique, for example.

Japanese Unexamined Patent Publication No. 2004-126669 (Paragraphs 0073 to 0126, FIGS. 1 to 7) discloses an example of a recycling support system by means of leasing industrial lead-acid batteries and car batteries (which are also lead-acid batteries). According to Patent Document 1, a battery manufacturer leases car batteries to car owners, and monitors conditions and usage of the leased car batteries by use of various sensors. Here, the information obtained from these sensors is gathered to a management center by use of user terminals such as car navigation devices. Then, the management center manages the conditions and usage of the car batteries individually by use of a database to predict the lifetime with a battery information analyzer and to recover the car batteries having little time to end. Meanwhile, the recovered batteries are separated into recyclable materials and wastes, and the recyclable materials are allegedly used again as the materials for car batteries by battery manufacturers. This system is supposed to be able to achieve a proper and reliable process for recycling or disposal of car batteries.

Meanwhile, only small-sized consumer batteries are recycled in the case of high-performance secondary batteries such as nickel cadmium batteries or in the case of capacitor systems and a full-scale recycle system has not been established yet in light of large-sized industrial secondary batteries of these types. In fact, the only secondary batteries that apply high-performance materials and are recycled into electrode materials are nickel cadmium batteries and lead-acid batteries. On the contrary, nickel-metal hydride batteries and lithium-ion batteries are merely used as raw materials of stainless steel products, magnets, and the like, and there is no technique for recycling these batteries as battery materials.

If hybrid electric vehicles and the like are made public and circulation of large-sized secondary batteries increases in the market in the above-mentioned situation where techniques for recycling secondary batteries have yet to be established, the disposal quantity of such large-sized secondary batteries will presumably become enormous. This is because of larger amounts and tremendously larger usage of materials of such large-sized secondary batteries in comparison with consumer products.

Reuse of the secondary batteries is an option to reduce the disposal quantity of the large-sized secondary batteries and to make effective use thereof. For example, only the reuse within the same system has been put into practice as seen in replacement of batteries with re-built products in hybrid electric vehicles. Nevertheless, battery manufacturers have prohibited to diverse applications of these batteries to those different from the original application. This is because it is not possible to ensure performances and safeties of the batteries when origins and usage histories thereof were uncertain.

Incidentally, a secondary battery, or a large-sized secondary battery for a vehicle use in particular, is often provided with a battery controller. The battery controller computes battery conditions for estimating a remaining battery level or exploiting the battery performance efficiently. Here, a host system is configured to control charging and discharging of the battery based on the information obtained by computing the battery conditions. In this specification, such a secondary battery and a battery controller for controlling operations of the secondary battery will be generically referred to as a "secondary battery system." Meanwhile, a secondary battery manufactured in a way that multiple cells are contained into a given case so as to satisfy predetermined electrical specifications will be referred to as a "secondary battery module." In other words, the secondary battery system is assumed to be composed of one or more secondary battery modules and the battery controller for controlling the secondary battery modules.

At this time, the battery controller includes a nonvolatile memory such as a flash memory. This nonvolatile memory stores electrical characteristic information and usage condition of each of the secondary battery modules to be controlled by the battery controller. Such information and condition include, namely, rated or initial capacity, resistance, range of voltage value where the battery is usable, range of current value, available power value, open-circuit voltage and the like. Moreover, programs including a remaining amount estimation computing program and an anomaly diagnostic program are also stored therein. In addition, anomaly flags by the diagnostic program, actual resistances of the batteries, and usage history information such as capacities, change rates, maximum and minimum operating voltages, and operating time of the batteries may be stored for the purpose of countermeasures in case of troubles, for example. That is, the battery controller normally retains the electrical characteristic information on the secondary battery modules subject to control, the control programs, the usage history information and the like.

Moreover, in the case of replacing or detaching the secondary battery system, the secondary battery system is generally disassembled into the individual secondary battery modules and the battery controller. When the secondary battery system is disassembled into the pieces, it is possible to read out the information on the anomaly flags for the batteries, which are stored in the nonvolatile memory of the battery controller, for example. However, links of that information with the secondary battery modules are hardly maintained once if the secondary battery system is disassembled. Moreover, the information on the electrical characteristics of the battery modules is lost simultaneously with the disassembly of the system because the information is conventionally stored in the controller unit. For these reasons, it is difficult to reuse the secondary battery modules after the disassembly.

As described above, in the conventional case, for example, of the lead-acid battery recycling support system disclosed in Japanese Unexamined Patent Publication No. 2004-126669, lead-acid batteries are disassembled or destroyed once after used, and only useful components or constituent materials are reused. In other words, the document contains the description concerning the technique for crushing and recycling used lead-acid batteries for vehicles and the like. However, the application of that technique is limited to lead-acid batteries and the document does not disclose any technique to reuse large-sized secondary batteries in general.

Moreover, the information including the electrical characteristic information, the usage conditions, and usage histories is essential to reuse secondary batteries. However, a secondary battery reuse system in which the information is utilized has yet to be realized. In the case of attempting to realize such a reuse system in the current technique, there is an obstacle when the secondary battery system is disassembled. That is, a correlation between the secondary battery modules with the information stored in the nonvolatile memory of the secondary battery system, such as the electrical characteristic information, the usage conditions or the usage histories are lost.

SUMMARY OF THE INVENTION

In view of the above-described problems of the related art, it is an object of the present invention to provide a secondary battery module which is capable of avoiding a loss of electrical characteristic information or usage history information on the secondary battery module included in a secondary battery system even when the secondary battery system is disassembled. It is also an object of the present invention to provide a battery information management device and a battery information management system for smoothly and efficiently reusing the secondary battery module. Accordingly, a lower-cost and environmental cycling battery reuse system is realized, in which a large-sized secondary battery module is utilized.

To achieve the object, the secondary battery module of the present invention includes battery information storage means for storing at least one of electrical characteristic information and usage history information on the secondary battery module, and interface means for connecting the battery information storage means to a battery controller for controlling an operation of the secondary battery module.

Meanwhile, a battery information management device of the present invention includes interface means to be connected to the secondary battery module. Here, battery information stored in the battery information storage means of the secondary battery module is read out by use of the interface means. The second battery module is then graded for reuse based on at least one threshold separately predetermined for the battery information and the battery information which is read out. Moreover, the battery information management device of the present invention includes a battery information database for accumulating the battery information on the secondary battery module read out by the interface means.

Moreover, in the battery information management system of the present invention, the battery information management device is connected to a terminal device through a communications network. The terminal device reads out the battery information stored in the battery information storage means of the secondary battery module. The battery information management device then receives transmission of the battery information read out from the secondary battery module by the terminal device. The battery information management device accumulates the battery information in the battery information database.

It is assumed that allowable limits (thresholds) of performances of secondary battery modules respectively for prescribed applications to first and second systems in each of which the secondary battery module is used are defined as L1 and L2 satisfying L2>L1 (provided that the allowable limits herein represent lower limits and the inequality sign is reversed when the allowable limits represent upper limits). The reuse system is configured to apply the secondary battery module used in the first system to the second system having the allowable limit L2 when a performance of the secondary battery module attains the allowable limit L1. Moreover, the reuse system applies the secondary battery module used in the second system to a third system having an allowable limit L3 (L3>L2) when the performance of the secondary battery module attains the allowable limit L2. Hereinafter, the secondary battery module is repeatedly applied in the same manner.

According to the secondary battery module of the present invention, the electrical characteristic information or the usage history information on the secondary battery module is stored in the battery information storage means of the secondary battery module instead of the battery controller. Accordingly, even if the secondary battery system is disassembled for reusing the secondary battery module so that the secondary battery module is separated from the battery controller, it is possible to prevent the loss of the electrical characteristic information or the usage history information on the secondary battery module. As a consequence, this makes it possible to reuse the secondary battery module.

Moreover, according to the battery information management device and the battery information management system of the present invention, the secondary battery module obtained by the disassembly is connected to the battery information management device or the terminal device. Accordingly, the electrical characteristic information or the usage history information on the secondary battery module, which is stored in the storage means thereof, is read out and the secondary battery module is graded for reuse. The information is then accumulated in the battery information database. The battery information database is accessible from everywhere through the communications network and the terminal device. Accordingly, it is possible to reuse the secondary battery module smoothly and efficiently.

Furthermore, a large-sized secondary battery can be repeatedly reused by means of the secondary battery reuse system or a secondary battery recovery and sales system of the present invention. Accordingly, it is possible to reduce the disposal amount of the secondary batteries, and also to reduce prices for such secondary batteries.

According to the present invention, it is possible to provide a secondary battery module which is capable of avoiding the loss of the electrical characteristic information and the usage history information on the secondary battery module included in a secondary battery system even when the secondary battery system is disassembled. This also makes it possible to reuse the secondary battery module smoothly and efficiently by use of the database accumulating the electrical characteristic information and the usage history information on the secondary battery module, and grading information for reusing the secondary battery module. Moreover, it is possible to effectively use up the inner energy of the battery. Such a configuration can contribute to reduction in the disposal amount of batteries and to reduction in battery costs. It is therefore highly effective for stabilizing prices of large-sized batteries. Since batteries are replaced based on predetermined thresholds, it is possible to simplify maintenances of the batteries and systems in which the batteries are used. It is also possible to control the batteries depending on variation in the battery performances associated with the use thereof.

DETAILED DESCRIPTION OF THE PREFERRED EMBODIMENTS

Now, an embodiment of the present invention will be described in detail with reference to the accompanying drawings.

(Aspect of Secondary Battery Reuse)

Figure 1:
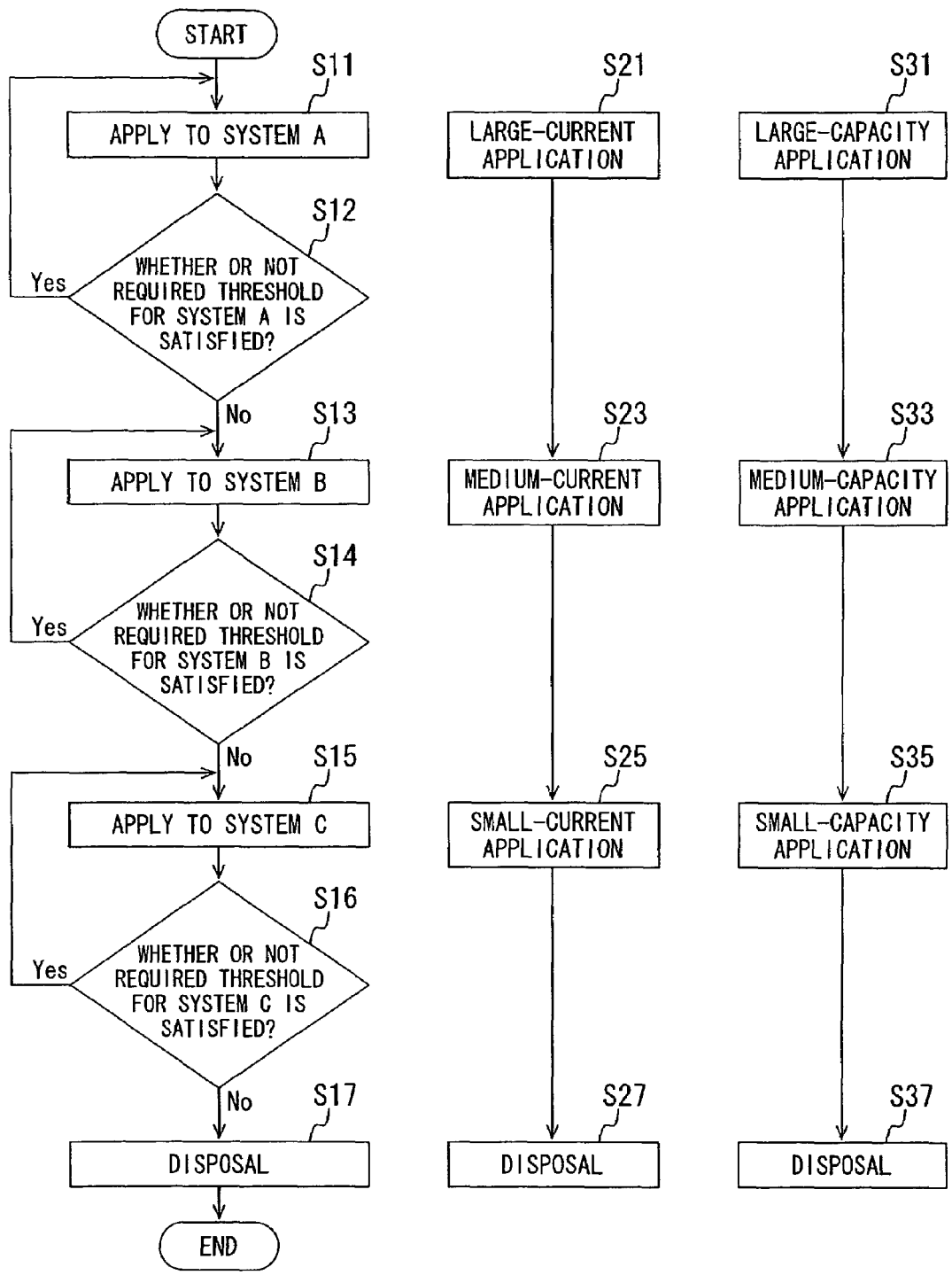
FIG. 1 is a view showing an example of an aspect of secondary battery reuse according to an embodiment of the present invention.

FIG. 1 is a view showing an example of an aspect of secondary battery reuse according to an embodiment of the present invention. Generally, a secondary battery can be repeatedly used by charging. However, for example, a chargeable electric capacity is gradually reduced and an internal resistance increases instead when reusing the secondary battery over and over again. In the end, the electric capacity and the internal resistance cannot meet thresholds that are defined in an application system, and the secondary battery would not be used any longer. Conventionally, such a secondary battery no longer used is just disposed of.

In this embodiment, as shown in FIG. 1, a secondary battery system is repeatedly applied to a certain system A (Step S11). In a case where values of the electrical characteristics and the like of a secondary battery module included in the secondary battery system do not satisfy thresholds required by the system A (No in Step S12), the process is advanced to Step S13. For example, in a case where the internal resistance of the secondary battery module becomes higher than a threshold $R_1$ required by the system A, the secondary battery system is applied to a system B as a reproduced secondary battery system either as it is or after disassembly and reconstruction, the system B having a required threshold $R_2$ of the internal resistance, which is higher than $R_1$, (Step S13).

Similarly, in a case where the values of electrical the characteristics and the like of the secondary battery module included in the recycled secondary battery system do not satisfy thresholds required by the system B (No in Step S14), the process is advanced to Step S15. For example, in a case where the internal resistance of the secondary battery module becomes higher than the threshold $R_2$ required by the system B, the secondary battery system is applied to a system C as a reproduced secondary battery system either as it is or after disassembly and reconstruction, the system C having a required threshold $R_3$ of the internal resistance, which is higher than $R_2$ (Step S15).

Moreover, in a case where the values of the electrical characteristics and the like of the secondary battery module included in the recycled secondary battery system do not satisfy thresholds required by the system C (No in Step S16), the process is advanced to Step S17. For example, in a case where the internal resistance of the secondary battery module becomes higher than the threshold $R_3$ required by the system C and there is no applicable system that allows an internal resistance higher than R3, the secondary battery will be disposed of (Step S17).

That is, assuming that the thresholds for the internal resistances required respectively by the systems A, B and C are $R_1$, $R_2$ and $R_3$, respectively, the secondary battery module is applied to the group of systems in which the required thresholds R for the internal resistances satisfy $R_1<R_2<R_3$.

As described above, in this embodiment, the secondary battery module is reused depending on the thresholds such as the electrical characteristics required by the application systems. In other words, even when the secondary battery module is no longer applicable to a certain system, the module will be reused in another system for which the module satisfies a limitation of the threshold.

To put it plainly, as shown in FIG. 1, the secondary battery module is first used in a large-current application (Step S21). When the secondary battery module is no longer usable in the large-current application, the module is then used in a medium-current application (Step S23). When the secondary battery module is no longer usable in the medium-current application, the module is then used in a small-current application (Step S25). In this case, assuming that currents I required for the applications are defined respectively as $I_1$ for the large-current application, $I_2$ for the medium-current application, and $I_3$ for the small-current application, then the currents I satisfy a correlation of $I_1>I_2>I_3$. Thereafter, the secondary battery module is disposed of when the module is no longer usable in the small-current application (Step S27).

Likewise, the secondary battery module is first used in a large-capacity application (Step S31). When the secondary battery module is no longer usable in the large-capacity application, the module is then used in a medium-capacity application (Step S33). When the secondary battery module is no longer usable in the medium-capacity application, the module is then used in a small-capacity application (Step S35). In this case, assuming that capacities C required for the applications are defined respectively as $C_1$ for the large-capacity application, $C_2$ for the medium-capacity application, and $C_3$ for the small-capacity application, then the capacities C satisfy a correlation of $C_1>C_2>C_3$. Thereafter, the secondary battery module is disposed of when the module is no longer usable in the small-capacity application (Step S37).

Meanwhile, in any of the steps of disposal (Steps S17, S27 and S37) in FIG. 1, the secondary battery module which can be disassembled and reconstructed is applied to processes classified into reconstruction, recycling, and final disposal of residue in accordance with predetermined processes by recycling companies.

Although the internal resistances, the currents, and the capacities of the battery are cited as the thresholds for judging the life of the secondary battery in the foregoing explanation, it is to be noted that the thresholds are not limited only to these factors. One or more thresholds may be selected from the factors, which represent the condition of the battery, including operating time of the battery, the resistance of the battery, a resistance changing rate of the battery, the capacity of the battery, a capacity changing rate of the battery, use intensity of the battery, a voltage of the battery, and the like. In this case, an index expressed as $R/R_0$ (R: a current resistance, $R_0$: an initial resistance) is used as the resistance changing rate of the battery, for example. Meanwhile, an index expressed as $Q/Q_0$ (Q: a current capacity, $Q_0$: an initial capacity) is used as the capacity changing rate of the battery, for example. Moreover, an index expressed as $Q_c/t$ ($Q_c$: an integrated capacity used in charging and discharging, t: the operating time of the battery), for example. In addition, the number of times of reuse is not limited to twice. The number of times of reuse may be once or more than twice. Furthermore, at the final round of reuse, the battery may be used as a primary battery instead of the secondary battery.

Next, an aspect of secondary battery reuse logistics will be described by use of FIGS. 2 and 3. Here, FIG. 2 is a view showing an example of an aspect of secondary battery reuse logistics according to the embodiment of the present invention, and FIG. 3 is a view showing a configuration example of a secondary battery system in the case of applying the present invention to a system product such as an automobile.

Figure 2:
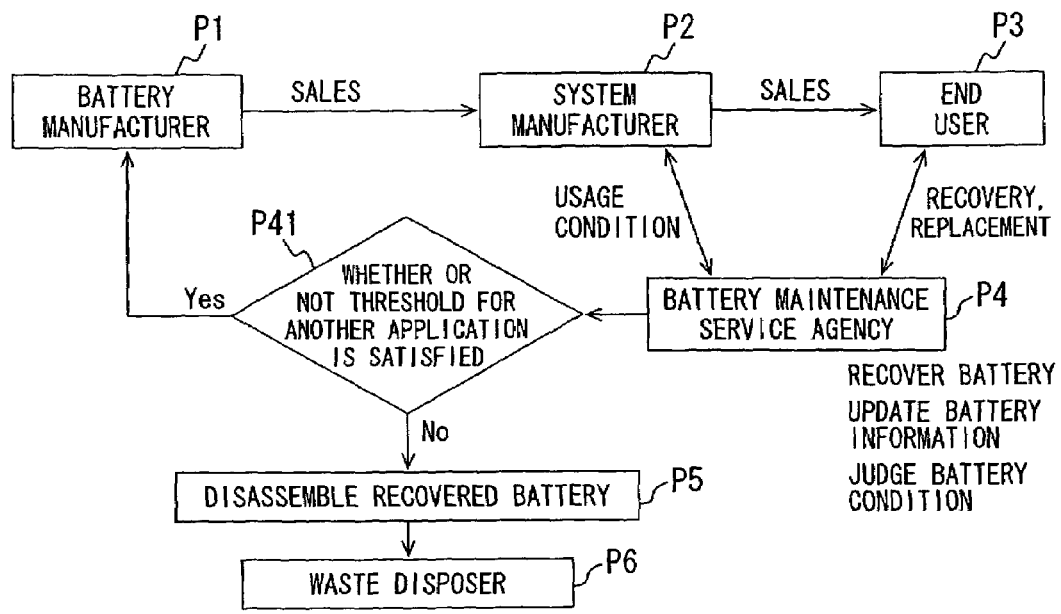
FIG. 2 is a view showing an example of an aspect of secondary battery reuse logistics according to the embodiment of the present invention.

In FIG. 2, a battery manufacturer P1 firstly manufactures cells and a secondary battery module (also referred to as an assembled battery) in which a plurality of the cells are combined. The cell or the secondary battery module thus manufactured is sold to a system manufacturer P2 such as an automobile manufacturer, for example.

The system manufacturer P2 constructs a secondary battery system by adding a battery controller to the purchased cells or secondary battery modules, and installs the secondary battery system into a system product such as an automobile, for example. In this case, the battery manufacturer P1 may manufacture the secondary battery system by adding the battery controller, and sell the secondary battery system to the system manufacturer.

Figure 3:
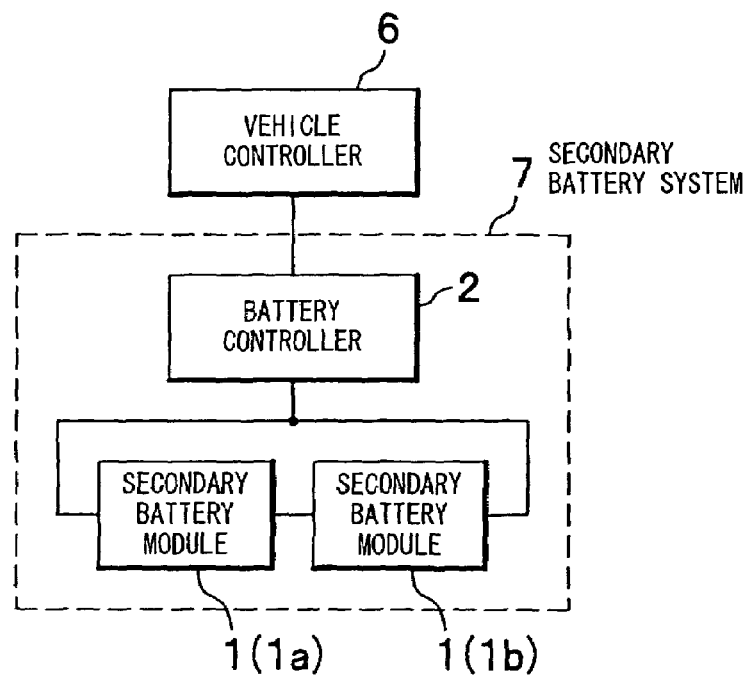
FIG. 3 is a view showing an example of a configuration of a secondary battery system in the case of applying the present invention to a system product such as an automobile.

Here, as shown in FIG. 3, the secondary battery system, for example, a secondary battery system 7 applicable to an automobile is formed by connecting two secondary battery modules 1 in series, and by further incorporating a battery controller 2 for controlling these secondary battery modules 1. Then, the secondary battery system 7 installed in the system product such as the automobile is controlled by a controller such as a vehicle controller 6 for controlling the entire system when appropriate.

Next, the system product incorporating the secondary battery system 7 is sold to an end user P3. The end user P3 uses the secondary battery system 7 while repeating charging and discharging in the course of operating the system. The battery controller 2 appropriately monitors the predetermined required thresholds for the electrical characteristics and the like, and notifies the system controller such as the vehicle controller 6 of a necessity of battery replacement before any values such as the electrical characteristics attain the required thresholds. The end user P3 learns the necessity of battery replacement by means of the notification by the system controller, such as an indicator display on a dashboard, and the end user P3 thus requests a battery maintenance service agency P4 to perform recovery and replacement of the secondary battery system 7.

Upon request by the end user P3, the battery maintenance service agency P4 recovers and replaces the secondary battery system 7. Moreover, the battery maintenance service agency P4 judges the battery condition and updating battery control characteristic information for optimization by maintenance and repair as appropriate or upon a request from an automobile repair and maintenance shop or the like.

Next, the battery maintenance service agency P4 disassembles the recovered secondary battery system 7 into the secondary battery modules 1, and separates the disassembled secondary battery modules 1 for reuse. The separation is conducted based on the thresholds of the secondary battery modules 1, such as the electrical characteristics. At this time, in this embodiment, the secondary battery module 1 includes storage means for storing information on the electrical characteristics or usage history of the secondary battery module 1 and reading means for reading the information out, which will be described later with reference to FIG. 4 and so forth. Accordingly, the battery maintenance service agency P4 can separate the secondary battery modules 1 easily by reading the information on the electrical characteristics or the usage history thereof.

At this time, the information on the electrical characteristics and the usage history includes multiple pieces of information selected out of anomaly flag information on overcharge, overdischarge, overcurrent or the like, a maximum operating voltage, a minimum operating voltage, a voltage range where the battery is operated, the operating time of the battery, the present resistance value of the battery, the capacity, the resistance changing rate, the capacity changing rate, a maximum operating temperature, a minimum operating temperature, integrated current usage, the use intensity $V_{int}$ of the battery, and the like. Here, assuming that the integrated current usage is $\Sigma I$, that the operating time is t, and that an average used voltage is $V_{av}$, then the use intensity $V_{int}$ of the battery is given by the following formula:

$$V_{int} = (\Sigma I)/t \text{ or } V_{int} = (\Sigma I)/V_{av}$$

The battery maintenance service agency P4 reads the information on the electrical characteristics or the usage history of the secondary battery module 1, which is stored in the storage means of the secondary battery module 1. The battery maintenance service agency P4 then compares the information with thresholds for other applications, which are prepared in advance (P41). That is, it is possible to separate or grade the used secondary battery module 1 by use of the thresholds for other applications. The secondary battery module 1 judged as reusable by the separation or grading is delivered to the battery manufacturer P1. Subsequently, the battery manufacturer P1 resells the delivered secondary battery module 1 to the system manufacturer P2 as appropriate depending on classifications as a result of the separation or on the grade.

Meanwhile, the secondary battery module 1 which is judged as not suitable for a recharging application in the module as a result of the separation or grading is discharged as a primary battery application, and is further disassembled into the cell level (P5). Then, the disassembled cells are discharged either as a secondary battery application or a primary battery application, and are then delivered to a waste disposer P6. The waste disposer P6 crushes and separates the delivered used cells and dispose of the waste separately as recyclable materials and waste residue.

(Configuration of Secondary Battery System)

Figure 4:
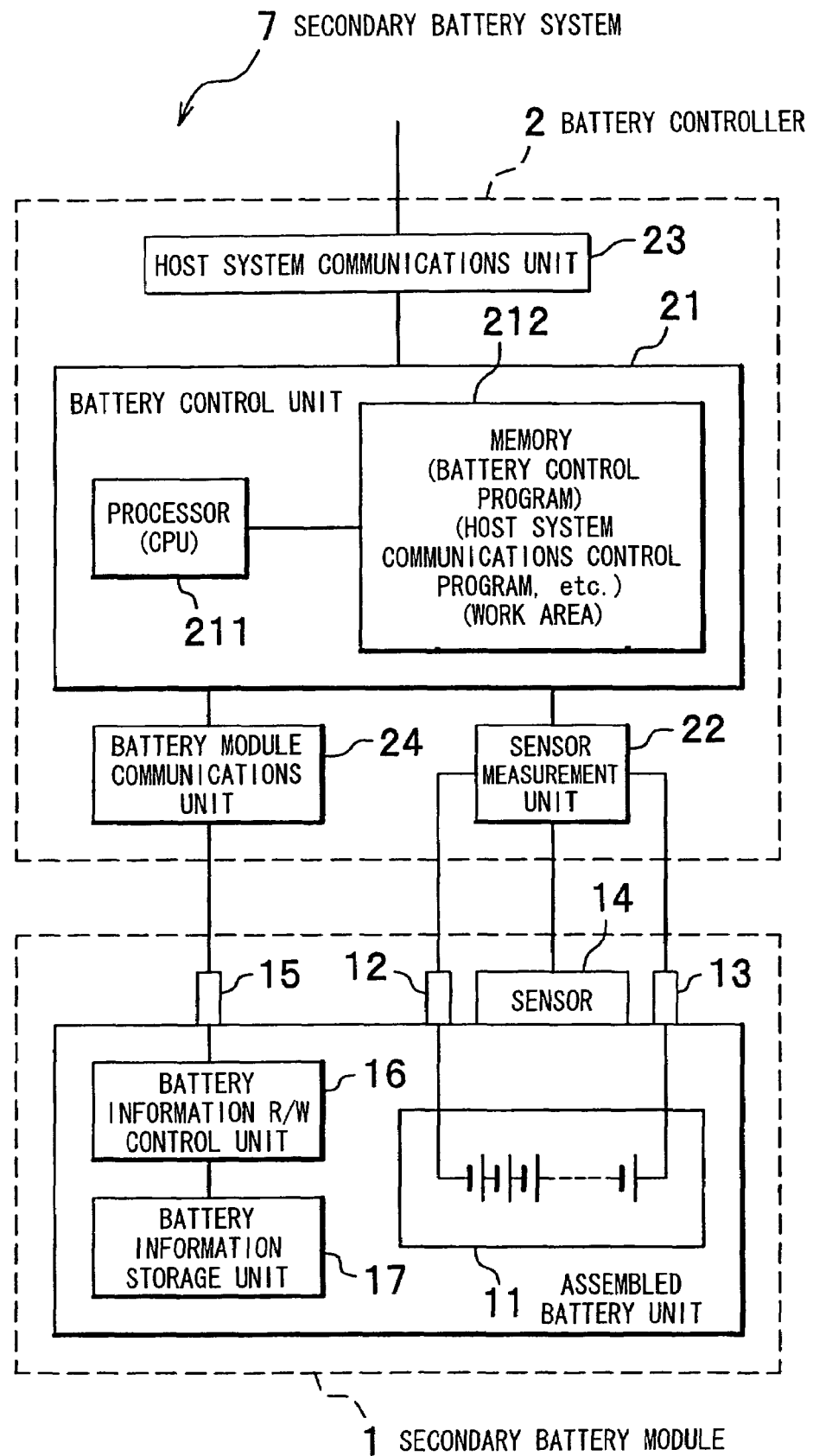
FIG. 4 is a view showing an example of a configuration of a secondary battery system according to the embodiment of the present invention.

FIG. 4 is a view showing an example of a configuration of the secondary battery system according to the embodiment of the present invention. As shown in FIG. 3 already, the secondary battery system 7 includes the secondary battery modules 1 and the batter controller 2. FIG. 4 shows the configuration in which the single secondary battery module 1 is connected to the single battery controller 2 in series. However, it is also possible to adopt a configuration in which multiple secondary battery modules 1 are connected to the single battery controller 2 in parallel.

As shown in FIG. 4, the secondary battery module 1 includes an assembled battery unit 11, battery electrode terminals 12 and 13, a sensor 14, a battery information storage unit 17, a battery information read/write (R/W) control unit 16, a battery information R/W terminal 15. The assembled battery unit 11 is configured by connecting multiple cells together in series, in parallel or in series-parallel. The battery electrode terminals 12 and 13 are connected respectively to electrodes located at both ends of the assembled battery unit 11. The sensor 14 includes a temperature sensor or the like. The battery information storage unit 17 stores the information on the electrical characteristics or the usage history of a battery of the secondary battery module. The battery information read/write (R/W) control unit 16 controls reading and writing of the information stored in the battery information storage unit 17. The battery information R/W terminal 15 connects the battery information R/W control unit 16 to the battery controller 2.

Here, the battery information storage unit 17 is typically formed of a nonvolatile semiconductor memory such as a flash memory, and retains the stored information even in a case where no power voltage is supplied thereto. Meanwhile, the battery information R/W control unit 16 includes a memory control circuit (not shown) and a communications interface circuit (not shown). The memory control circuit is configured to control reading and writing the information from and into the battery information storage unit 17. The communications interface circuit is configured to communicate with the battery controller 2 through the battery information R/W terminal 15. The communications interface circuit in this case may include a serial communications interface circuit such as RS-232C, Local Interconnect Network (LIN) or Universal Serial Bus (USB).

Here, the battery information to be stored in the battery information storage unit 17 may include: an initial capacity; an initial resistance; a chargeable and dischargeable current values; a power value; a voltage range where the battery is to be operated; present values of capacity, of resistance, of resistance changing rate, and of capacity changing rate; the history information on the current values when discharge or recharge has taken place, on the voltage range where the battery has been operated, and on the operating time of the battery; the anomaly flag information on overcharge, overdischarge and so forth; the use intensity of the battery; and the like.

Meanwhile, the battery controller 2 includes a battery control unit 21, a sensor measurement unit 22, a host system communications unit 23 and a battery module communications unit 24. The battery control unit 21 controls the operations of the battery. The sensor measurement unit 22 is connected to the sensor 14, the battery electrode terminals 12 and 13, and the like for measuring signal levels thereof. The host system communications unit 23 transmits and receives information to and from a controller of a host system to which the secondary battery system 7 is applied. The battery module communications unit 24 transmits and receives the information to and from the battery information storage unit 17 of the secondary battery module 1.

Here, the battery control unit 21 includes a processor 211 formed of what is termed as a central processing unit (CPU) or the like, and a memory 212. The memory 212 stores programs including a battery control program for controlling the battery and a host system communications control program for controlling the communications with the host system. The memory 212 is also used as a work area to be used when these programs are executed.

Meanwhile, the battery module communications unit 24 includes an interface circuit corresponding to the communications interface circuit of the battery information R/W control unit 16. The interface circuit may be formed of, for example, the serial communications interface circuit such as RS-232C, LIN or USB. Similarly, the host system communications unit 23 may also be formed of the serial communications interface circuit such as RS-232C, LIN or USB. In a case where the host system such as the vehicle controller 6 is connected to multiple subordinate systems, a local area network (LAN) is used as a communications line for connecting those systems to one another. In this case, the host system communications unit 23 includes a network interface circuit for controlling a protocol such as Controller Area Network (CAN) or Transmission Control Protocol/Internet Protocol (TCP/IP). Meanwhile, the sensor measurement unit 22 measures an output signal from the sensor 14, a voltage and an output current between the battery electrode terminals 12 and 13, and the like, and the sensor measurement unit 22 inputs digital information obtained by analog-digital (A/D) conversion to the battery control unit 21.

Figure 5:
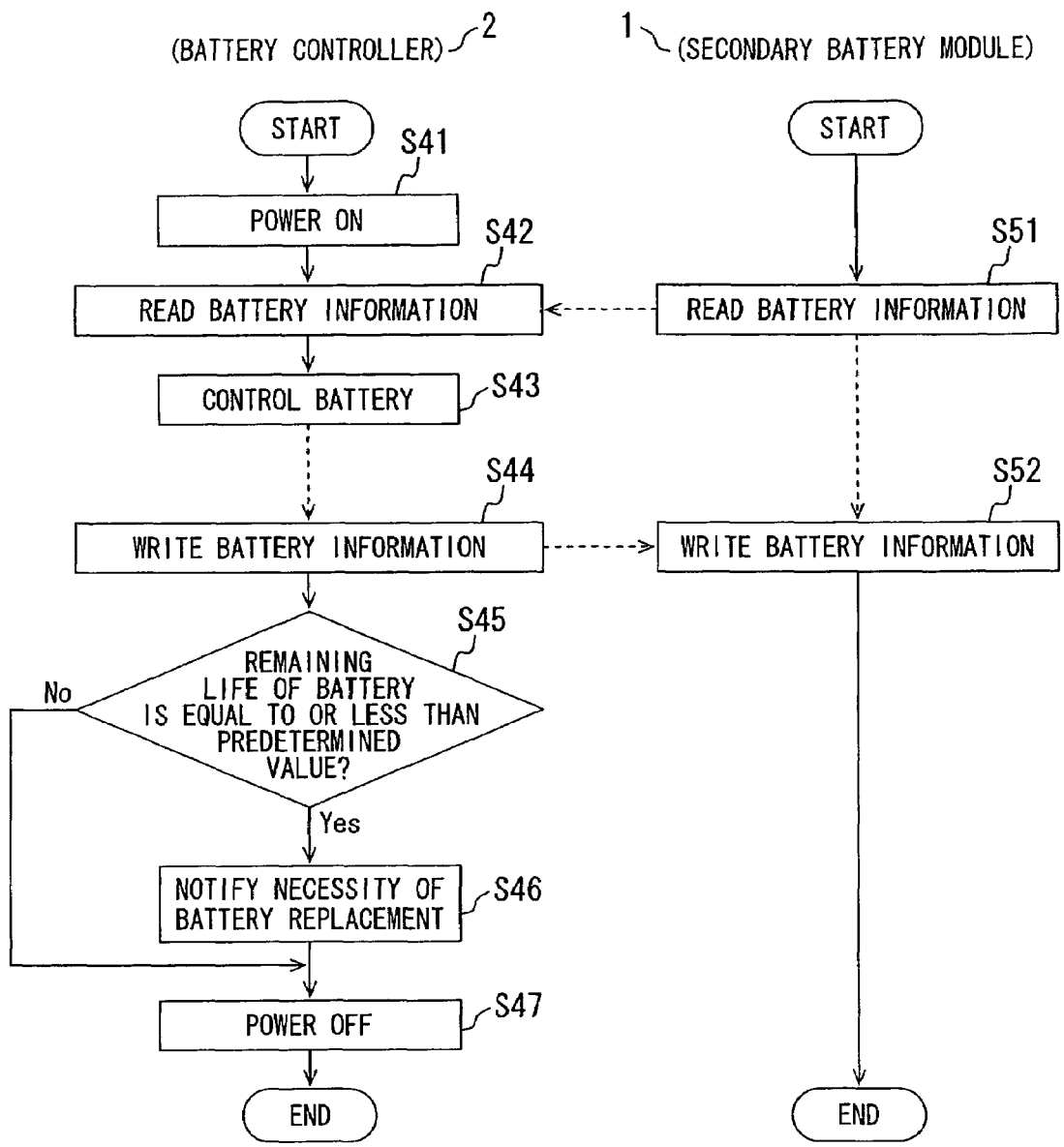
FIG. 5 is a view showing an outline of operations of a battery controller according to the embodiment of the present invention in the form of a processing flow.

FIG. 5 is a view showing an outline of operations of the battery controller in the form of a processing flow. As shown in FIG. 5, when power is turned on (Step S41), the battery controller 2 read the battery information stored in the battery information storage unit 17 of the secondary battery module 1, namely, the information on the electrical characteristics or the usage history of the secondary battery module 1 (Step S42). Specifically, the battery controller 2 instructs the battery information R/W control unit 16 of the secondary battery module 1 to read the battery information. In response to the instruction, the battery information R/W control unit 16 reads the battery information stored in the battery information storage unit 17 (Step S51) and outputs the information to the battery controller 2. The battery controller 2 reads the outputted battery information.

Thereafter, the battery controller 2 executes predetermined battery control on the secondary battery module 1 by using the battery information (Step S43). The battery information is changed as a result of using and controlling the secondary battery module 1. The battery controller 2, then, writes the battery information into the battery information storage unit 17 of the secondary battery module 1 at predetermined time intervals such as every one hour and immediately before turning the power off (Step S44). Specifically, the battery information R/W control unit 16 receives the battery information to be written from the battery controller 2, and writes the received battery information into the battery information storage unit 17 (Step S52).

Meanwhile, the battery controller 2 predicts remaining life of the secondary battery module 1 at predetermined time intervals or immediately before turning the power off in accordance with a prescribed prediction algorithm. In a case where the remaining life becomes equal to or below a predetermined value (Yes in Step S45), the battery controller 2 notifies the host system of a necessity of battery replacement (Step S46). Here, the notification is usually transmitted to the host system in the form of information such as a status flag. In addition, it is also possible to provide a mounting board (not shown) or the like of the battery controller 2 with a light emitting diode for displaying the necessity of battery replacement.

Upon recognition of the necessity of battery replacement, the host system, for example, the vehicle controller 6 displays an advance notice of battery exhaustion on an indicator and the like of a dashboard, for example, to notify a driver of the vehicle (the end user P3) of the necessity to replace the secondary battery module 1, that is, the secondary battery system 7. In this way, the end user P3 who has recognized the necessity to replace the secondary battery system 7 requests the battery maintenance service agency P4 for the replacement.

As described above, in this embodiment, the battery information storage unit 17 of the secondary battery module 1 always stores the newest information on the electrical characteristics and the usage history of the secondary battery module 1. In addition, the battery information storage unit 17 is formed of the nonvolatile memory as described previously. For this reason, the battery information stored in the battery information storage unit 17 does not disappear even when the power supply is stopped. Accordingly, even when the secondary battery system 7 recovered by the battery maintenance service agency P4 is disassembled into the battery controller 2 and the secondary battery module 1 for reuse, the secondary battery module 1 retains its own battery information in the battery information storage unit 17. In this way, the information on the electrical characteristics and the usage history of the secondary battery module 1 is obtained, and it is therefore possible to easily find out a destination for reuse, that is, for a new application.

Meanwhile, in the case of the secondary battery system 7 including the multiple secondary battery modules 1 and the battery controller 2, the information on the electrical characteristics of the respective secondary battery modules 1 are conventionally stored collectively in the memory 212 of the battery controller 2. Accordingly, in a case where one of the multiple secondary battery modules 1 causes a failure such as an internal short-circuit or a voltage imbalance, all the multiple secondary battery modules 1 included in the secondary battery system 7 need to be replaced. On the contrary, in this embodiment, each of the secondary battery modules 1 retains its own information on the electrical characteristics and the usage history in the corresponding battery information storage unit 17. Accordingly, it is possible to easily find out which secondary battery module 1 has such a failure by referring to the information on the electrical characteristics thereof. It is, therefore, possible to replace only the secondary battery module 1 having the failure while continuing to use other secondary battery modules 1 without failures.

Here, suitable applications of the secondary battery system 7 include movable bodies such as an electric vehicle, a hybrid electric vehicle, a trolleyless electric train, an electric locomotive, a hybrid train, a power source for construction machinery, a golf cart, an electric bicycle, an electric motorbike or an electric wheel chair. Furthermore, the suitable application also include secondary battery applications for stationary use, such as a power absorption-regeneration device, a power system for power leveling, a stationary backup power source, a power source for a cellular telephone base station, a redundant power source for a car braking system, a backup power source for a fuel cell system, a power storage system, an emergency power supply, an emergency lamp or a power storage equipment for a power generation system, and other applications as primary power sources.

Among these suitable applications, a larger system uses more secondary battery modules 1 that are connected in series, in parallel or in series-parallel. Accordingly, when this embodiment is applied to such a large-scale system, it is possible to drastically reduce the cases where the secondary battery modules 1 are wasted by unnecessary replacement or disposal. Moreover, it is possible to easily find out new applications. It is thus possible to more efficiently utilize the secondary battery modules 1. As a result, dramatic effects are expected in light of reduction in sales prices of the secondary battery modules 1 as well as reduction in amounts of waste disposal.

(Battery Information Management System)

Figure 7:
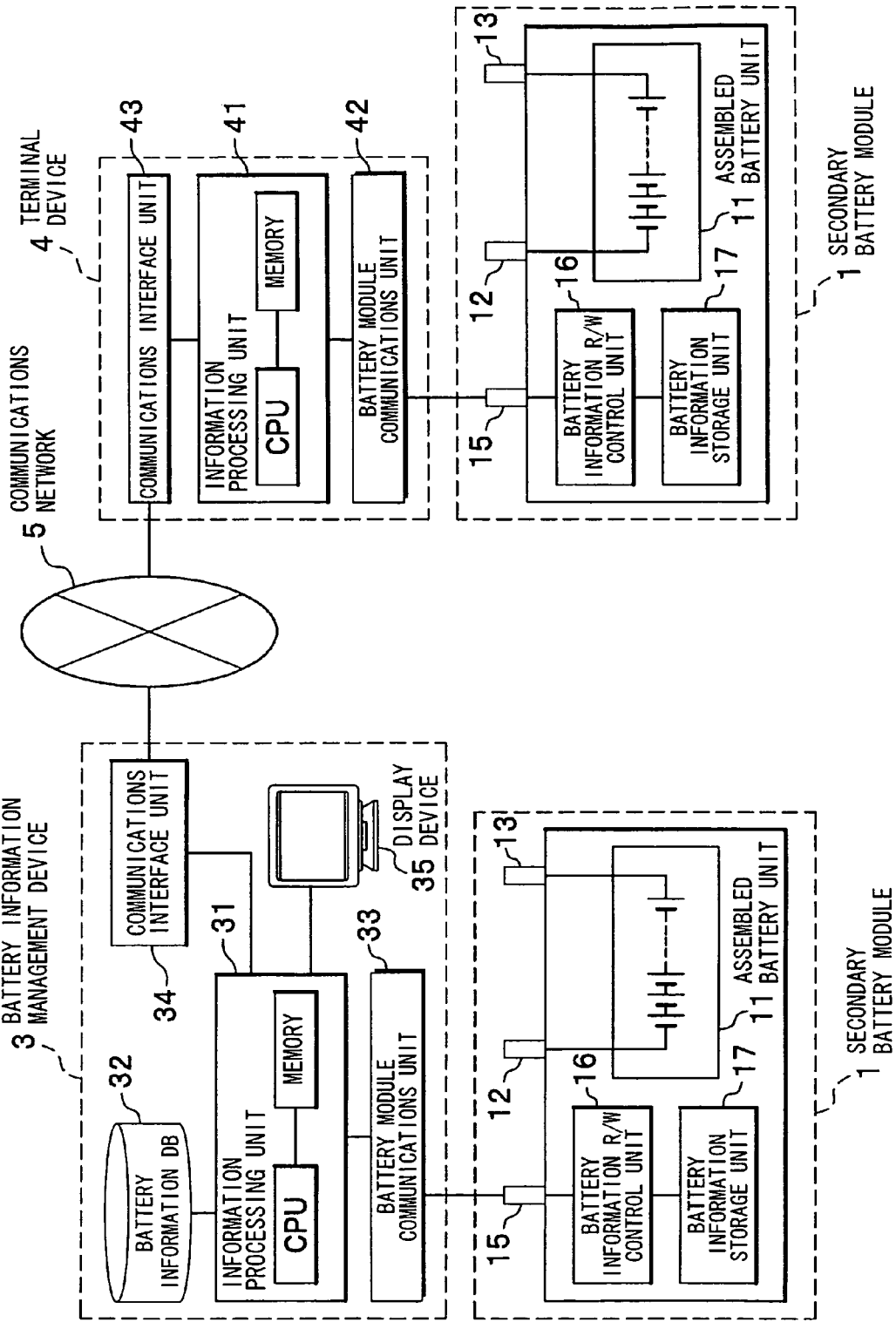
FIG. 7 is a view showing an example of configurations of a battery information management device and a terminal device in the battery information management system according to the embodiment of the present invention.
Figure 8:
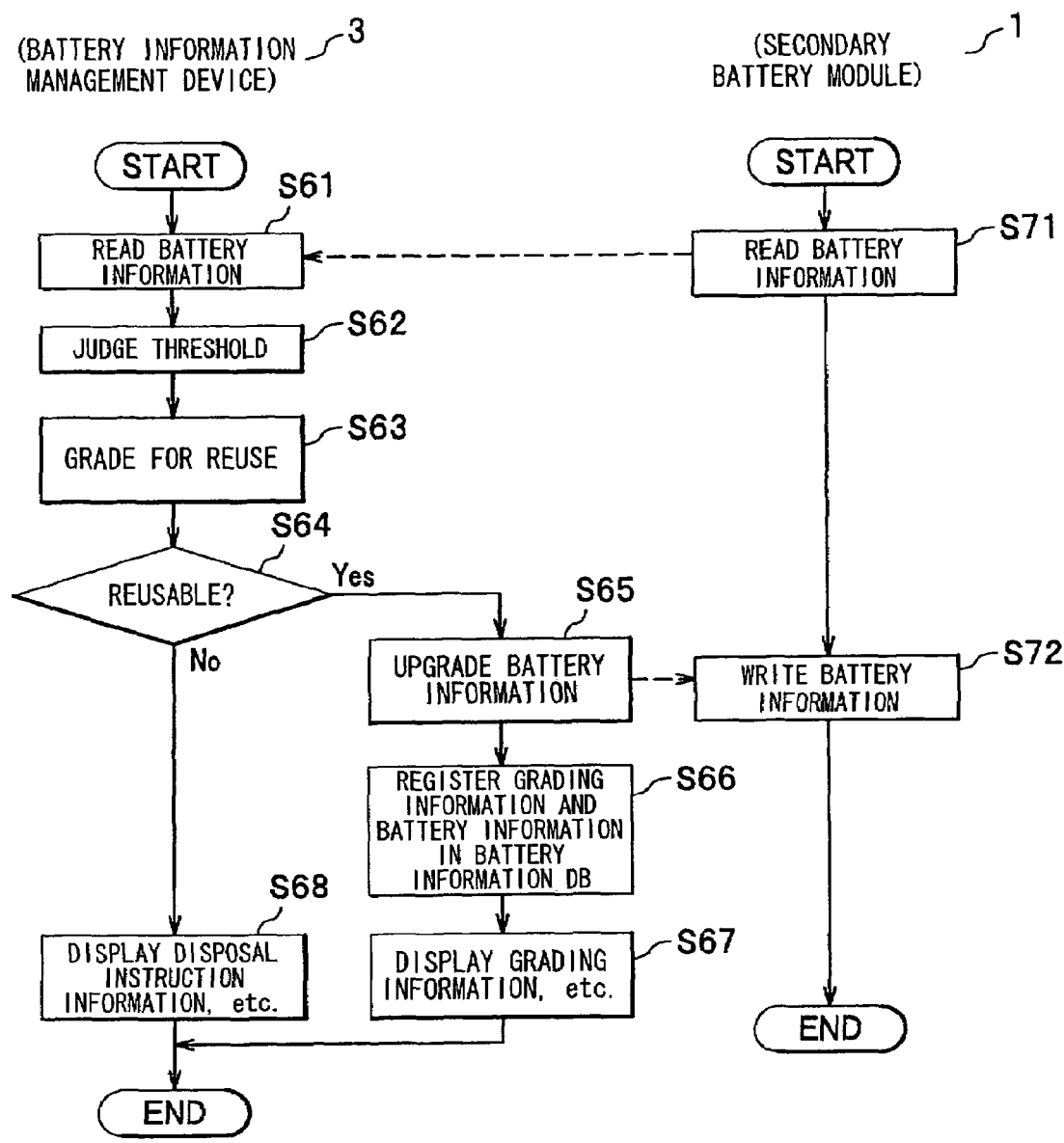
FIG. 8 is a view showing an example of a processing flow at a time of processing a recovered secondary battery module, in the battery information management device according to the embodiment of the present invention.

Now, a battery information management system according to this embodiment will be described with reference to FIG. 6 to FIG. 8. Here, FIG. 6 is a view showing an example of an overall configuration of a battery information management system according to the embodiment of the present invention, FIG. 7 is a view showing an example of configurations of a battery information management device and a terminal device in the battery information management system, and FIG. 8 is a view showing an example of a process flow at the time of processing a recovered secondary battery module in the battery information management system.

Figure 6:
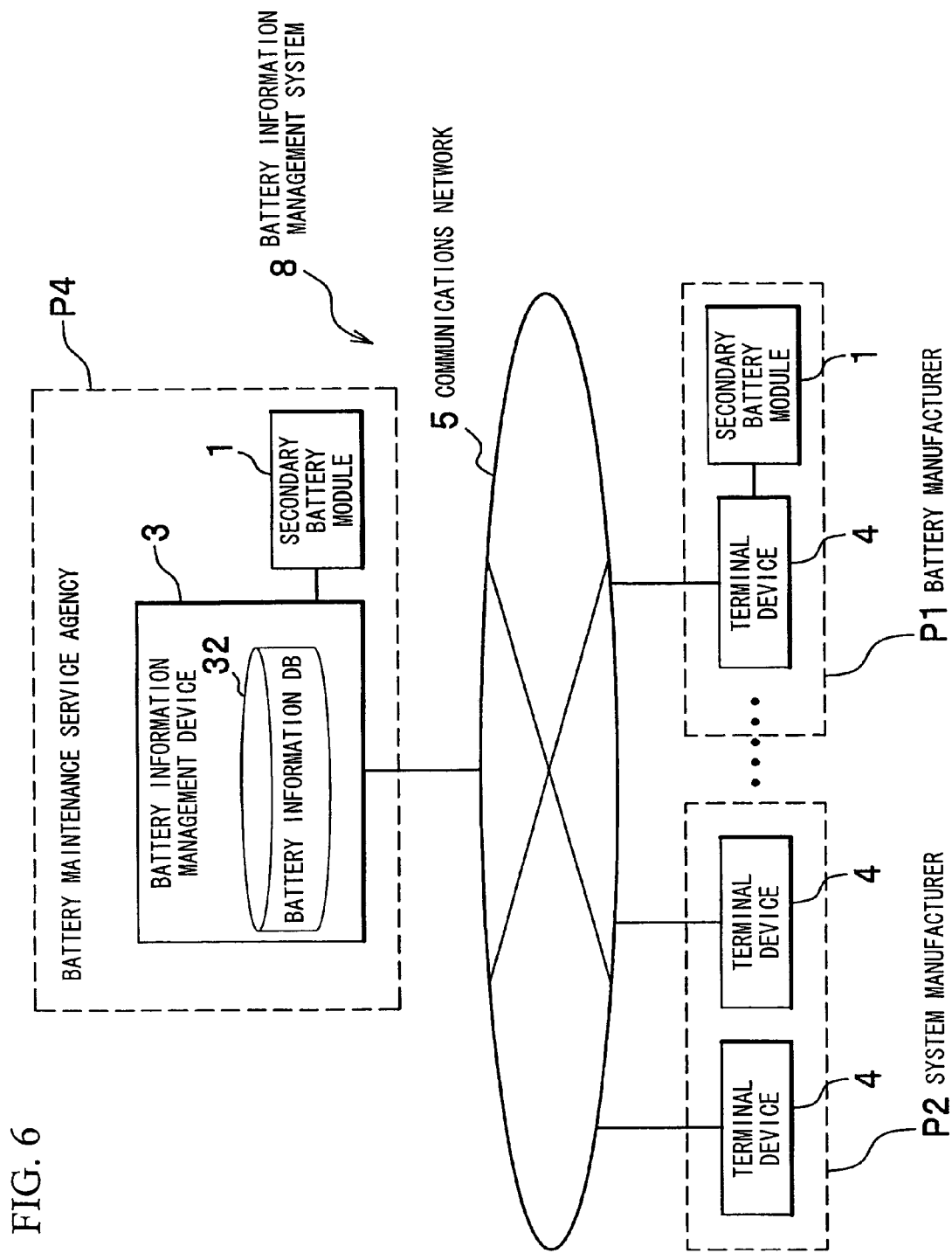
FIG. 6 is a view showing an example of an overall configuration of a battery information management system according to the embodiment of the present invention.

As shown in FIG. 6, a battery information management system 8 includes a battery information management device 3 and multiple terminal devices 4. The battery information management device 3 is installed in the battery maintenance service agency P4 and the multiple terminal devices 4 are provided to a battery manufacturer P1 and a system manufacturer P2. The battery information management device 3 and the multiple terminal devices 4 are all connected to one another through a communications network 5. The battery information management device 3 includes a battery information database (DB) 32 and the battery information concerning the secondary battery modules 1 either in use or after recovery is accumulated in the battery information DB 32. Meanwhile, concerning the secondary battery modules 1 after recovery, the battery information DB 32 further accumulates grading information sorted for reuse, for example.

Incidentally, the secondary battery modules 1 manufactured by the battery manufacturer P1 are caused to undergo measurement of the battery information such as the information on the electrical characteristics, at the time of shipping inspection thereof, for example. Then, the measured battery information is written into the battery information storage unit 17 as initial values by use of the terminal device 4, and is also transmitted to the battery information management device 3. The battery information management device 3 accumulates the received battery information in the battery information DB 32 while associating the battery information with identification information on the secondary battery module 1.

Meanwhile, the secondary battery module 1 currently used by the end user P3 is connected to the terminal device 4 in the event of repair or maintenance at a maintenance shop of the system manufacturer P2, for example. Then, the battery information written in the battery information storage unit 17 of the secondary battery module 1 is read out, and is modified for updating when necessary. Then, the battery information is written again into the battery information storage unit 17. The battery information is also transmitted to the battery information management device 3, and is accumulated in the battery information DB 32.

Meanwhile, the battery maintenance service agency P4 reads out the battery information stored in the battery information storage units 17 of the recovered secondary battery modules 1, and grades the secondary battery modules 1 based on the battery information thus read out. Thereafter, the secondary battery modules 1 are separated into reusable modules and non-reusable modules. Concerning the reusable modules, the battery information in the battery information storage unit 17 thereof is updated as appropriate, and the updated battery information and the grading information are accumulated in the battery information DB 32.

As described above, in the battery information management system 8, the battery information DB 32 is not merely configured to accumulate the information. Rather, the accumulated information is accessible not only from the battery information management device 3 at the battery maintenance service agency P4 but also from the terminal devices 4 at the battery manufacture P1 as well as the terminal devices 4 at the system manufacturer P2. For this reason, it is possible to manage the battery information and the grading information of the respective secondary battery modules 1 in a lump. Accordingly, it is easy to execute the updating of battery control information and the like regarding the secondary battery modules 1 in use. In addition, it is possible to smoothly reuse the recovered secondary battery modules 1.

Next, the configurations of the battery information management device 3 and the terminal device 4 will be described with reference to FIG. 7. As shown in FIG. 7, the battery information management device 3 is what is termed as a server device including the battery information DB 32. The principal part thereof is formed of an information processing unit 31 that includes a CPU and a memory. In addition to the information processing unit 31, the battery information management device 3 includes a battery module communications unit 33, a communications interface unit 34 and a display device 35. The battery module communications unit 33 writes or reads the information into and out of the battery information storage unit 17 of the secondary battery module 1. The communications interface unit 34 is connected to the communications network 5, and the display device 35 displays a result of processing by the information processing unit 31, and the like.

Here, the battery module communications unit 33 is connected to the battery information R/W terminal 15 of the secondary battery module 1. For this reason, the battery module communications unit 33 is formed of a serial communications interface circuit such as RS-232C, LIN or USB so as to correspond to the communications interface circuit of the battery information R/W control unit 16. In addition, the communications interface unit 34 is connected to the communications network 5 through which communications are made by use of the protocol such as CAN or TCP/IP, and is therefore formed of a network interface circuit for controlling the protocol such as CAN or TCP/IP.

Moreover, the terminal device 4 includes an information processing unit 41 formed of a CPU and a memory, a battery module communications unit 42 for writing and reading the information into and out of the battery information storage unit 17 of the secondary battery module 1, and a communications interface unit 43 connected to the communications network 5. In this case, the information processing unit 41 is formed of what is termed as a personal computer, for example. Additionally, the batter module communications unit 42 and the communications interface unit 43 have similar configurations and functions to those of the battery module communications unit 33 and the communications interface unit 34 of the battery information management device 3, respectively.

Incidentally, in FIG. 7, a configuration in which the battery information management device 3 does not include the battery module communications unit 33 is also acceptable. In this case, however, the terminal device 4 is supposed to be provided to the battery maintenance service agency P4 where the battery information management device 3 is installed. Accordingly, the battery information management device 3 is configured to read and write the battery information stored in the battery information storage unit 17 of the secondary battery module 1 through the terminal device 4.

Next, an example of a processing flow to be executed by the battery information management device 3 in the case of processing the recovered secondary battery module 1 will be described with reference to FIG. 8. First, the battery information management device 3 reads the battery information stored in the battery information storage unit 17 of the secondary battery module 1 (Step S61). Specifically, the battery information management device 3 instructs the battery information R/W control unit 16 of the secondary battery module 1 to read the battery information. In response, the battery information R/W control unit 16 reads the battery information stored in the battery information storage unit 17 (Step S71), and outputs the battery information to the battery information management device 3. The battery information management device 3 reads the outputted battery information.

Subsequently, the battery information management device 3 makes a judgment on to which threshold among the thresholds required respectively by reuse target systems the electric characteristics of the secondary battery module 1 conform, based on the acquired battery information (Step S62). The battery information management device 3 then grades the module for reuse (Step S63). In a case where there is a suitable reuse target and the module is therefore judged as reusable (Yes in Step S64), the battery control information included in the battery information of the secondary battery module 1 is updated (Step S65). Specifically, the secondary battery module 1 receives the updated battery information from the battery information management device 3, and then writes the received battery information into the battery information storage unit 17 (Step S72).

Simultaneously, the grading information obtained in Step S63, the battery information updated in Step S65 and the like are registered in the battery information DB 32 (Step S66). The grading information is then displayed on the display device 35 or the like (Step S67). On the contrary, in a case where the secondary battery module 1 is not reusable (No in Step S64), disposal instruction information and the like regarding the secondary battery module 1 are displayed on the display device 35 or the like (Step S68).

Incidentally, on the judgment of the thresholds in Step S62 and grading for reuse in Step S63, as the thresholds, used are values including at least one out of the resistance, the capacity, the operating time of the battery, the resistance changing rate, the capacity changing rate, the use intensity of the battery and the like of the secondary battery module 1.

As described above, in this embodiment, the battery maintenance service agency P4 can easily perform selection of reuse or disposal of the recovered secondary battery module 1 as well as grading for reuse by use of the battery information management device 3. Moreover, the battery information such as the information on the electric characteristics and the usage history of the recovered secondary battery module 1 and the grading information for reuse are registered in the battery information DB 32 of the battery information management device 3. The battery manufacturer P1 and the system manufacturer P2 can therefore make reference thereto. Accordingly, it is possible to smoothly reuse the recovered secondary battery module 1.

First Modified Example of the Embodiment

In the above-described embodiment, the battery module communications unit 24 of the battery controller 2 is connected to the battery information R/W terminal 15 of the secondary battery module 1 by use of wired signals as shown in FIG. 4 and the like. In a modified example of the embodiment, they are mutually connected by use of wireless signals. Moreover, the battery information R/W control unit 16 and the battery information storage unit 17 are formed of what is termed as radio frequency identification (RFID) tags. A storage unit of the RFID tag is generally formed of a nonvolatile memory such as a flash memory, and is therefore suitable for the battery information storage unit 17 as well.

In this modified example of the embodiment, the battery module communications unit 24 of the battery controller 2 is formed of a RFID tag reader-writer. Similarly, the battery module communications unit 33 of the battery information management device 3 and the battery module communications unit 42 of the terminal device 4 are also formed of the RFID tag reader-writers.

As described above, implementation of the battery information R/W control unit 16 and the battery information storage unit 17 by use of the RFID tags has an advantage that it is possible to embody the present invention with very little modification of a case or a housing of the existing secondary battery module 1. In other words, although there are various types of RFID tags, those tags generally have small shapes, and such a RFID tag only needs to be simply attached to the secondary battery module 1.

Second Modified Example of the Embodiment

Figure 9:
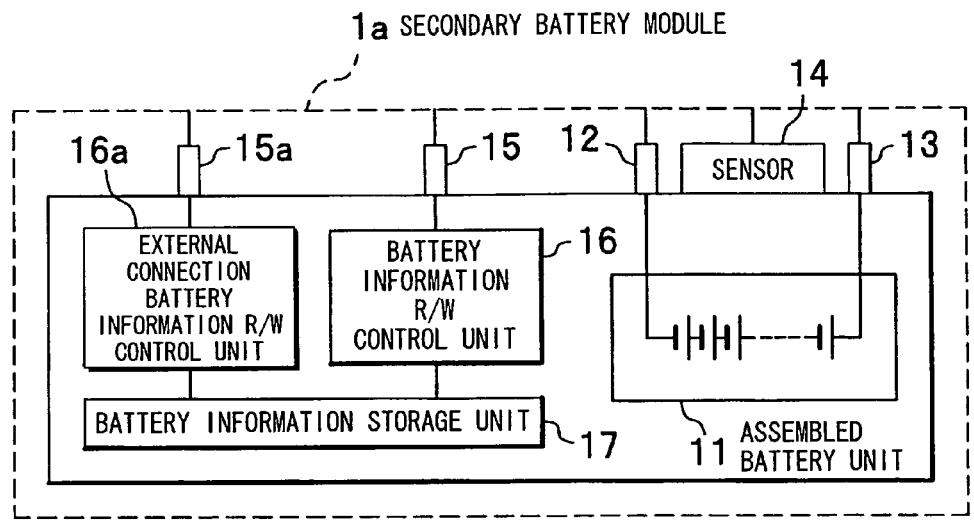
FIG. 9 is a view showing an example of a configuration of a secondary battery module according to a second modified example of the embodiment of the present invention.

FIG. 9 is a view showing an example of a configuration of a secondary battery module according to a second modified example of the embodiment. A secondary battery module 1*a* in the modified example of the embodiment includes an external connection battery information R/W control unit 16*a* in addition to the battery information R/W control unit 16 to be connected to the battery controller 2. Specifically, the external connection battery information R/W control unit 16*a* is connected to an external device through an external connection battery information R/W terminal 15*a*.

Here, the external device is assumed to be either the battery information management device 3 or the terminal device 4. Accordingly, a communications interface circuit of the external connection battery information R/W control unit 16*a* for communicating with the external device may be any of an RS-232C interface, USB, LIN, and also a network interface for controlling a protocol such as CAN or TCP/IP as long as it is the same interface as that of the battery module communications unit 33 or 42 of the battery information management device 3 or the terminal device 4. Accordingly, the external connection battery information R/W control unit 16*a* may be the same interface as that of the battery information R/W control unit 16 or may be a different interface.

As described above, the secondary battery module 1a includes the external connection battery information R/W control unit 16a. This makes it possible to connect the battery information management device 3 or the terminal device 4 to the external connection battery information R/W control unit 16 a without disassembling the connection between the battery controller 2 and the secondary battery module 1a. For this reason, the system manufacturer P2 or the battery maintenance service agency P4 can judge the battery condition for a checkup or update the battery information without detaching the battery controller 2. It is therefore possible to improve operation efficiency when judging the battery condition and updating the battery information. Incidentally, although the above-described embodiments are explained on the assumption that the battery maintenance service agency P4 is an independent entity, the battery maintenance service agency P4 may be a service department of the battery manufacturer P1.

Third Modified Example of the Embodiment

Figure 10:
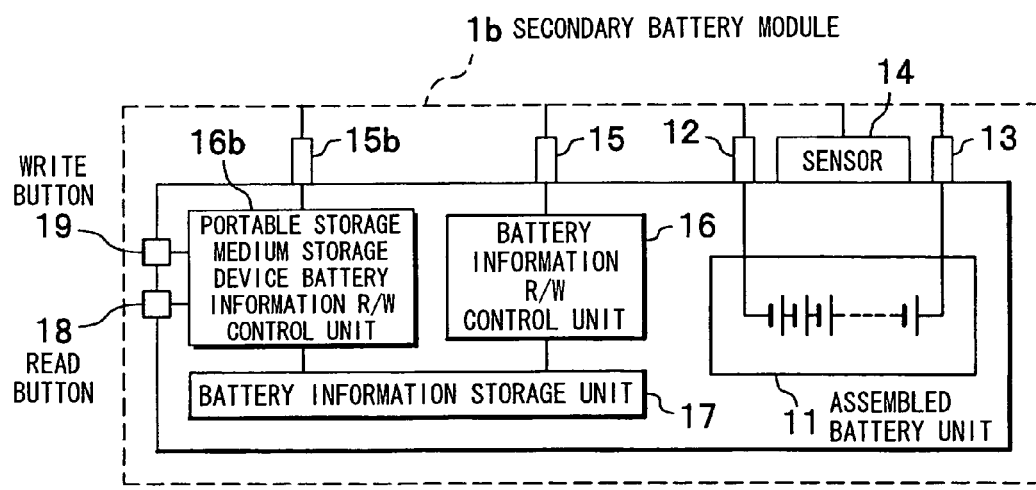
FIG. 10 is a view showing an example of a configuration of a secondary battery module according to a third modified example of the embodiment of the present invention.

FIG. 10 is a view showing an example of a configuration of a secondary battery module according to a third modified example of the embodiment. A secondary battery module 1b in the modified example of the embodiment includes a portable storage medium storage device battery information R/W control unit 16b in addition to the battery information R/W control unit 16 to be connected to the battery controller 2. Here, the portable storage medium storage device may be a flexible disk, a hard disk, a compact disk (CD), a digital versatile disk (DVD), a USB memory, an integrated circuit (IC) card memory, and the like. A portable storage medium storage device herein is assumed to include mechanism drive units for disk rotation, head movement and the like in the case of a disk type storage device.

Moreover, a portable storage medium storage device battery information R/W terminal 15b, a read button 18, and a write button 19 are provided in association with the portable storage medium storage device battery information R/W control unit 16b. Here, the portable storage medium storage device battery information R/W terminal 15b is a terminal for the connection with the external portable storage medium storage device by use of wired signals and the like. Meanwhile, the read button 18 is a button used for instructions to read the battery information stored in the battery information storage unit 17 and to write the battery information thus read out into the external portable storage medium storage device. On the other hand, the write button 19 is a button used for instructions to read the information written in the external portable storage medium storage device and to write the information thus read out into the battery information storage unit 17.

The portable storage medium storage device battery information R/W control unit 16b includes a portable storage medium storage device drive unit (which is not shown and represents a logical drive unit in this case). The portable storage medium storage device drive unit controls reading or writing of the information stored in the portable storage medium storage device. Moreover, the read button 18 and the write button 19 are connected to the portable storage medium storage device drive unit. Accordingly, operations for reading and writing the battery information stored in the battery information storage unit 17 are executed by pressing these buttons.

Specifically, the battery information stored in the battery information storage unit 17 is read out when the read button 18 is pressed down, and the battery information thus read out is written into the external portable storage medium storage device. Meanwhile, the information written in the external portable storage medium storage device is read out when the write button 19 is pressed down, and the information thus read out is written into the battery information storage unit 17.

In the meantime, both of the battery information management device and the terminal device 4 includes a drive unit for reading and writing information in the above-described portable storage medium storage device as a usual configuration. For this reason, according to this modified example of the embodiment, it is possible to exchange the information between the battery information storage unit 17 of the secondary battery module 1 and any of the battery information management device 3 and the terminal device 4 by way of the portable storage medium. Accordingly, even in a place where the battery information management device 3 and the terminal device 4 do not exist, it is possible to collect the battery information or to update the battery information by use of the portable storage medium storage device such as a USB memory.

Fourth Modified Example of the Embodiment

Any of the above-described examples of the embodiment do not incorporate a mechanism for protecting the battery information stored in the battery information storage unit 17. This modified example of the embodiment to be described below is an example of protecting the battery information by use of a password will be described.

In this modified example of the embodiment, the battery information R/W control unit 16 (see FIGS. 4 and 7) is provided with a password judging unit (not shown). In a case where the battery controller 2 or the battery information management device 3 writes and reads the battery information into and out of the battery information storage unit 17 (Steps 51 and S52 in FIG. 5, or Steps S71 and S72 in FIG. 8), for example, a reading or writing operation of the battery information is not initiated unless a predetermined password is inputted to the battery information R/W control unit 16 in advance.

Specifically, the battery information R/W control unit 16 includes a nonvolatile memory and the predetermined password is stored in the nonvolatile memory. The password judging unit compares a character string, which is inputted prior to reading or writing the battery information, with the predetermined password. As a result, the operation for reading or writing the battery information is validated when the inputted character string is identical to the password. On the contrary, the operation for reading or writing the battery information is invalidated when the inputted character string is different from the password. Here, the nonvolatile memory for storing the password may be part of the memory in the battery information storage unit 17.

Meanwhile, the external connection battery information R/W control unit 16a shown in FIG. 9 is also provided with a similar password judging unit (not shown) so as to protect the battery information in the battery information storage unit 17 against a reading or writing operation from an external device.

Moreover, the portable storage medium storage device battery information R/W control unit 16b shown in FIG. 10 is also provided with a similar password judging unit (not shown). This makes it possible to prevent an attempt to read the battery information in the battery information storage unit 17 out to the portable storage medium storage device, or an attempt to write the information from the portable storage medium storage device into the battery information storage unit 17 without inputting a predetermined password. That is, even when the read button 18 or the write button 19 is pressed down, the operation for writing or reading the battery information into and out of the battery information storage unit 17 is not initiated in a case where the predetermined password is not inputted.

In general, a password is information known only to a related party and a third party usually has no way to know that information. For this reason, according to this modified example of the embodiment, the third party who does not know the password cannot read or write the battery information stored in the battery information storage unit 17. In this way, it is possible to prevent destruction or manipulation of the battery information by a malicious third party.

Fifth Modified Example of the Embodiment

This modified example of the embodiment to be described below is an example of protecting the battery information stored in the battery information storage unit 17 by encoding. In this case, the battery information storage unit 17 stores encoded battery information.

In this modified example of the embodiment, the battery control unit 21 of the battery controller 2 includes an encoding-decoding unit (not shown) based on a prescribed encoding method. Moreover, when writing the battery information into the battery information storage unit 17 (Step S44 in FIG. 5), the battery controller 2 encodes the battery information to be written by use of the encoding-decoding unit in advance. The battery controller 2 then writes the encoded information into the battery information storage unit 17. Meanwhile, when reading the battery information out of the battery information storage unit 17 (Step S42 in FIG. 5), the battery controller 2 decodes the encoded battery information at the time of reading by use of the encoding-decoding unit and retrieves the plain text battery information.

Meanwhile, the information processing unit 31 of the battery information management device 3 and the information processing unit 41 of the terminal device 4 (see FIG. 7) also include similar encoding-decoding units, respectively (not shown). In a case where the battery information management device 3 or the like writes and reads the battery information into and out of the battery information storage unit 17 (Steps S61 and S65 in FIG. 8, and so forth), the encoding-decoding unit decodes the encoded battery information or encodes the battery information to be written. Naturally, the same encoding method and the same encoding key as those used in the encoding-decoding unit of the battery controller 2 must be employed in the encoding-decoding units included respectively in the information processing units 31 and 41 respectively of the battery information management device 3 and the terminal device 4.

As described above, according to the modified example of the embodiment, parties other than the related party cannot decode the battery information stored in the battery information storage unit 17. Accordingly, it is possible to avoid leakage of technical information to a third party, which may be contained in the battery information.

Sixth Modified Example of the Embodiment

Figure 11:
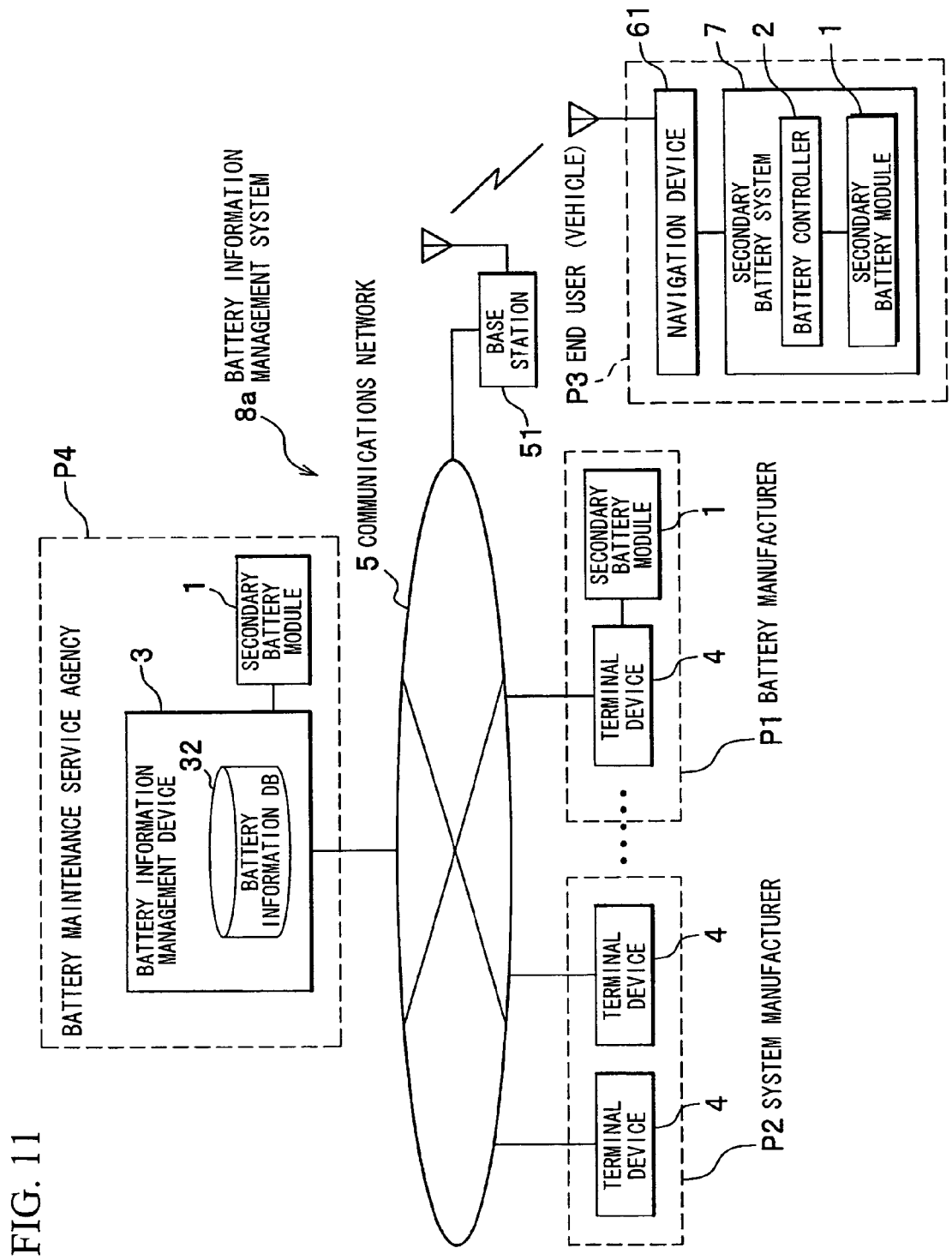
FIG. 11 is a view showing an example of an overall configuration of a battery information management system according to a sixth modified example of the embodiment of the present invention.

FIG. 11 is a view showing an example of an overall configuration of a battery information management system according to a sixth modified example of the embodiment of the present invention. The configuration in FIG. 11 is different from that in FIG. 6 in the following points. The secondary battery system 7 currently used by the end user P3 such as a vehicle is connected to a navigation device 61 or the like included in a host system of the secondary battery system 7 or a part of the host system. Additionally, the secondary battery system 7 is further connected to the communications network 5 through a base station 51 of cellular telephones or the like, which can communicate with the navigation device 61. That is, the secondary battery system 7 in use is connected to the battery information management device 3 through the communications network 5.

In this modified example of the embodiment, the battery controller 2 transmits the battery information stored in the battery information storage unit 17 to the host system thereof such as the navigation device 61. This transmission is performed when writing new battery information into the battery information storage unit 17 of the secondary battery module 1 or at predetermined time intervals, such as once in a day. Then, the navigation device 61 transmits the battery information thus received to the battery information management device 3 through the communications network 5 or the like. Thereafter, the battery information management device 3 registers the received battery information in the battery information DB 32 while associating the received battery information with the identification information of the secondary battery module 1.

Accordingly, the battery information management device 3 can acquire and constantly monitor the battery information on the secondary battery module 1 in use anytime without a limitation to an occasion of maintenance or repair of the host system. Moreover, the battery information management device 3 can also modify the battery information stored in the battery information storage unit 17 of the secondary battery module 1 through the communications network 5, the navigation device 61, and the like. Accordingly, the battery information management device 3 is able to predict the remaining life of the secondary battery module 1 in use at any time, and to update the battery information to be stored in the battery information storage unit 17 to the newest version at the earliest convenience.

As described above, according to the modified example of the embodiment, the battery information management device 3 is able to acquire the newest battery information stored in the battery information storage unit 17 of the secondary battery module 1. The battery information management device 3 is also able to update the battery information with adding the newest battery control information and the like thereto. Accordingly, this makes it possible to operate the secondary battery module 1 efficiently at any time.

Concrete Examples of the Embodiment

Now, concrete examples of a secondary battery in which the secondary battery module 1, the secondary battery system 7, the battery information management device 3 and the battery information management system 8 according to the above-described embodiment are utilized, and moreover, a reuse system, a sales method, and the like for the secondary battery will be described below in detail.

First Example of an Aspect of the Embodiment

The secondary battery system 7 in which a lithium-ion secondary battery is used and a reuse example thereof will be described with reference to FIGS. 3 and 4. The secondary battery system 7 includes the secondary battery module 1 formed by connecting multiple cells in series-parallel. Specifically, in this example, the secondary battery module 1 has a battery voltage of 173 [V] and a capacity Ca [Ah], which is formed by connecting 48 cells in series, each of which has an average voltage of 3.6 [V] and a capacity Ca [Ah]. This secondary battery system 7 is used by a host system such as the vehicle controller 6. Note that the codes in the brackets [ ] represent units.

In this example, the battery information such as the information on the electrical characteristics or the usage history of the secondary battery module 1 is stored in the battery information storage unit 17 provided on a housing of the secondary battery module 1. Here, the battery information storage unit 17 is provided inside or outside the housing of the secondary battery module 1, or is divided into two portions to be separately provided inside and outside the housing. The battery information storage unit 17 includes a rewritable memory. The battery information storage unit 17 thus can be rewritten by means of communications from outside through the battery information R/W control unit 16. Moreover, the battery controller 2 of the secondary battery system 7 in this example is configured to detect the state of the battery based on battery characteristics of the secondary battery module 1 as well as information detected by current, voltage, and temperature sensors, and to communicate the information with the host system such as the vehicle controller 6.

Considering the case of applying this battery to a hybrid electric vehicle having a motor output of 35 [kW], the secondary battery system 7 will have the configuration as shown in FIG. 3. Specifically, the secondary battery system 7 is configured by serially connecting the two secondary battery modules 1a and 1b each having the battery voltage of 173 [V] to each other, and by further connecting the battery controller 2 thereto. Moreover, the secondary battery system 7 is connected to the vehicle controller 6 of the hybrid electric vehicle.

In the above-described secondary battery system 7, the battery controller 2 conventionally stores the electrical characteristic data of these secondary battery modules 1. For this reason, in a case where a failure occurred in the secondary battery module 1a during operation and the secondary battery module 1a needs replacement, it is necessary to replace the secondary battery module 1b at the same to align electrical characteristic data between the two secondary battery modules. That is, in this case, an internal resistance R of the secondary battery module 1b is greater than an initial internal resistance $R_0$ thereof, but is smaller than a threshold resistance value $R_{L1}$ which causes a system failure ($R_0 < R < R_{L1}$). In other words, the module 1b is still usable as the battery. However, the secondary battery module 1b becomes subject to disposal in spite of the above fact.

On the contrary, in the case of this example, the characteristic data of the battery accompany the corresponding battery. Therefore, it is possible to use the secondary battery module 1b for another system having a different standard. Alternatively, it is possible to continue to use the secondary battery module 1b while replacing only the secondary battery module 1a.

Meanwhile, in a case where the secondary battery module 1b is detached and applied to another system such as an uninterruptible power supply having an internal resistance R' as the threshold for functioning the system, the secondary battery module 1b is applicable to the uninterruptible power supply if the internal resistance R of the detached battery 1b is smaller than the internal resistance R'. In this case, a current value I' used by the uninterruptible power supply is around 1 CA, and a current value I0 used by the hybrid electric vehicle is greater than the current value I'. Accordingly, the system functions sufficiently with a smaller current.

For the uninterruptible power supply, a lead-acid battery is generally utilized. An emergency power supply is preserved in a fully charged state and is discharged in the event of emergency. In this case, the lead-acid battery is apt to generate heat as a result of charging and causes side reactions such as decomposition of an electrolyte. Moreover, the lead-acid battery has a large self-discharge factor and may cause substantial degradation of the capacity as a result of constant and repetitive charging. As a consequence, the lead-acid battery tends to be unusable after a period of approximately one to three years.

On the contrary, in a case where using the lithium-ion battery is used for the uninterruptible power supply, the lithium-ion battery has little self-discharge factor and no memory effect of decreasing the capacity as a result of repeating shallow charge and discharge. The lithium-ion battery also has a long cycle life and a long storage life, and is usable over a period of approximately five to ten years. In addition, the lithium-ion battery has a high cell voltage and is also lightweight. Accordingly, it is possible to realize an emergency power system that is easier to use than the conventional lead-acid battery systems. Moreover, in the case of a system that requires a large capacity, it is possible to meet system requirements by using multiple cells or secondary battery modules 1 connected in parallel. Furthermore, the existing emergency power system designed for the lead-acid battery application is applicable to the case of using the lithium-ion battery only by modifying the design of input and output sections for the battery. Therefore, it is possible to construct a system having the same performance as that of the lead-acid battery system substantially at the same price while reducing development costs. In this way, it is possible to realize the reliable system with a long battery life.

Second Example of an Aspect of the Embodiment

Next, a lithium-ion secondary battery having an average voltage of 173 [V] and a capacity of Ca [Ah] to be applied to a hybrid automobile system having a motor output of 35 [kW] and a reuse example thereof will be described with reference to FIG. 11.

First, the threshold for the operating range of the secondary battery module 1 is set to the battery information storage unit 17. Specifically, the secondary battery module 1 incorporates the battery information storage unit 17, and the electrical characteristic data and the usage history thereof are written in the rewritable memory included in the battery information storage unit 17. In this example, a resistance value $R_1$, for instance, is written in the memory as the threshold for making the secondary battery module 1 usable. Then, the battery controller 2 notifies the host system such as the navigation device 61 of attainment of the threshold at the point when the resistance value $R_0$ of the secondary battery module 1 attains $R_1$ [mΩ] ($R_1 > R0$).

The navigation device 61 transmits this threshold attainment information to the battery information management device 3 installed at the maintenance service agency P4 through the communications network 5 or the like. The battery information management device 3 having received the information registers that fact in the battery information DB 32 and notifies a maintenance operator of that fact. Based on the information, the operator of the maintenance service agency P4 recovers and replaces the secondary battery system 7. Incidentally, in a case where the navigation device 61 served as the host system does not have a communicating function and is not connected to the communications network 5, a driver of a vehicle or the like may notify the maintenance service agency P4 through a telephone or the like, when he or she notices the attainment of the threshold of the secondary battery module 1 by way of a display device of the navigation device 61.

The battery information including the threshold information, the usage history, presence or absence of anomaly data, and the like is stored in the battery information storage unit 17 of the recovered secondary battery module 1. The battery information management device 3 then reads these pieces of the battery information stored in the battery information storage unit 17 through the battery module communications unit 33 (see FIG. 7), and confirms the usage history and the like. Thereafter, in a case where the characteristic data or the like need correction, all or part of the characteristic data are rewritten.

In this way, the secondary battery module 1 after rewriting the characteristic data or the like is used within a range of the internal resistance R satisfying $R_1 < R < R_L$ [mΩ]. For example, the secondary battery module 1 is shipped for an application to a system having a motor output of 25 [kW]. Here, the code $R_L$ represents a threshold indicating a limit for the battery to function the system required in the battery. Note that, in the case of the 25 [kW] system as well, the secondary battery module 1 is replaced at the point when the resistance value R attains the threshold $R_L$ as similar to the application to the 35 [kW] system. Alternatively, the secondary battery module 1 may be detached as a result of judgment that the module comes to an end of its life.

When the detached secondary battery module 1 has a capacity of C' [Ah] and a resistance R" [mΩ], this secondary battery module 1 is mounted on a light car as a hybrid power system, the light car functioning at an internal resistance in a range of $R1 < R" < R_L$ and having a tare of 600 [kg] and a motor output of 5 [kW]. If this power system is constructed by use of a lead-acid battery, the power system weighs about 45 [kg]. On the contrary, when this power system is constructed by use of the lithium-ion secondary battery, the weight is reduced to 20 kg. Accordingly, the tare of the vehicle is also reduced as a whole, and the fuel efficiency thereof is also improved.

Third Example of an Aspect of the Embodiment

Next, an example of reusing a train power supply system to be applied to a hybrid system with a diesel engine will be described.

This train power system is required to have an output which is at least several tens of times greater than that of a small automobile. Accordingly, the secondary battery system 7 is constructed by connecting lithium-ion secondary batteries in x series and y parallel (x and y are positive integers) to achieve an average voltage of $V_1$ [V] and a capacity of $C_0$ [Ah]. Here, the resistance value $R_{L1}$ is preset as the system threshold to the secondary battery modules 1 of the secondary battery system 7. In using the secondary battery system 7, the battery controller 2 issues a warning for battery replacement to a host system when the resistance of the secondary battery module 1 attains the resistance value $R_{L1}$ defined as the threshold. In response to this, the secondary battery modules 1 are unloaded.

The unloaded secondary battery module 1 exerts a significant voltage drop due to an increase in the internal resistance attributable to deterioration, and is not possible to provide a sufficient output current for the train power supply system. However, the secondary battery module 1 is still applicable to a system having loose conditions of a resistance value $R_r$ and a current $I_r$ as thresholds necessary for functioning the system, i.e. the system in which a current $I_t$ that the unloaded secondary. battery module 1 can output is greater than the required current $I_r$ ($I_r < I_t$). Accordingly, data including the resistance value $R_{L1}$ and a rate of increase in the resistance are read out of the history information of the secondary battery module 1. The resistance value $R_r$ as a threshold for the new application system and other factors are then determined based on these values thus read out. Accordingly, the secondary battery module 1 is applied to a battery, for example, in battery equipment for a cellular telephone base station, which satisfies $R_{L1} < R_r$.

In this way, the unloaded secondary battery module 1 is used as the battery in the battery equipment for the cellular telephone base station. This makes it possible to extend a usable period of the same equipment as compared a usable period to conventional lead-acid battery equipment. Moreover, it is possible to reduce weight of the battery necessary for covering required electric power. As a result, it is easier to install the cellular telephone base station on a roof of a building in a city, for example, and thereby to achieve weight reduction and space saving for the equipment.

Fourth Example of an Aspect of the Embodiment

Next, an example of reusing a battery type regenerated power absorber having an average voltage of $V_1$ [V], a capacity of $C_0$ [Ah], and an output of B [kW], which is constructed by connecting lithium-ion secondary batteries in x1 series and y1 parallel (x1 and y1 are positive integers) will be described.

The battery controller 2 issues a warning for battery replacement to a host system or the like when the resistance value of the secondary battery module 1 attains a preset resistance value $R_{LS1}$ defined as the threshold. In response to this, the secondary battery modules 1 are unloaded. Each unloaded secondary battery module 1 preserves a state of health (SOH) at the point of unloading, which includes characteristic data, usage history data, and the like of the secondary battery module 1.

Accordingly, based on the information, the unloaded secondary battery modules 1 are connected in x2 series (x2 is a positive integer), and are applied to a 35 [kW] hybrid vehicle system. Thereafter, when the secondary battery modules 1 are used in the hybrid vehicle system and the resistance values thereof attain a predetermined threshold $R_{LS2}$, the secondary battery modules 1 are applied to confirmation of the battery performances, and are then applied to a system having a threshold resistance value of $R_{LS3}$ ($R_{LS2} < R_{LS3}$), such as a hybrid system for a light car having a motor output of 5 [kW].

Moreover, when the resistance values of the secondary battery modules 1 attain the threshold $R_{LS3}$ in this hybrid system for the light car, each secondary battery module 1 is disassembled into cells. It should be noted that the battery manufacturer P1 or the battery maintenance service agency P4 reads the characteristic data such as the resistance or the capacity as well as the history information stored in the battery information storage units 17 of the secondary battery modules 1 prior to disassembling the secondary battery modules 1. Then, the battery manufacturer P1 or the battery maintenance service agency P4 stores the information in the battery information DB 32 of the battery information management device 3, for example. Moreover, the characteristic data, such as a voltage of $V_1/n$ [V] and a capacity of C' [mAh], of the cells obtained by the disassembly are calculated based on the information. Here, the code $V_1$ denotes a voltage of the secondary battery module 1 before disassembly and the code n represents the number of series of the cells.

Next, several pieces of the cells obtained by the disassembly as described above are reassembled to form an uninterruptible power source having a voltage range of 12 to 14 [V], for example, and the uninterruptible power source is applied to a system that functions under conditions of a capacity $C_r<C'$ and a resistance $R_r>R_{LS3}$. It is also possible to apply the reassembled cells similarly to rechargeable devices included in an emergency lamp, a night-light, and a solar light. Moreover, the reassembled cells are applied to a system configured to discharge a current I satisfying $I<I_{rs}$ (the code $I_{rs}$ denotes a maximum current value when applied to the system) as a primary battery represented by a power source of a flashlight. The cells are disposed of after entirely discharged.

When the secondary battery is utilized as described above, it is possible to use inner energy of the battery more effectively and to reduce the voltage at the time of disposal. Accordingly, probability of occurrence of heat generation due to a short circuit or liquid spillage is reduced and safety is also ensured at the time of disposal. In addition, by establishing this reuse system, it is possible to reduce initial investment costs of the battery and to reduce initial installation costs of the large-size battery on the part of a user.

Fifth Example of an Aspect of the Embodiment

Next, an example of reusing a battery type regenerated power absorber having an average voltage of $V_3$ [V] and a capacity of $C_0$ [F] constructed by connecting electric double layer capacitor batteries in x series and y parallel (x and y are positive integers) will be described.

The battery controller 2 issues a warning for battery replacement to a host system when resistance value of the secondary battery module 1 formed of the electric double layer capacitors attains a predetermined threshold resistance value $R_{LS1}$. In response to this, the secondary battery modules 1 are unloaded. Each unloaded secondary battery module 1 stores the battery usage history and the SOH at the point of unloading, which includes the capacity, the resistance, and the like.

Therefore, based on this information, the unloaded secondary battery modules 1 are connected in x series (x is a positive integer) and applied to an A' [kW] hybrid vehicle system. Moreover, the secondary battery modules 1 of which the resistance values attain a predetermined threshold $R_{LS2}$ are applied to confirmation of the battery performances, and are then loaded on a hybrid system of a light car having a motor output of B' [kW], which functions at an internal resistance R satisfying $R_{LS2}<R<R_{LS3}$.

When the electric double layer capacitors are utilized as described above, it is possible to use inner energy of the battery more effectively. Moreover, by establishing this reuse system, it is possible to reduce initial investment costs of the battery and to reduce initial installation costs of the large-size battery on the part of a user.

Sixth Example of an Aspect of the Embodiment

Next, an example of reusing a large vehicle hybrid system having an average voltage of $V_0$ [V], a capacity of $C_0$ [Ah], and a motor output of C' [kW], constructed by connecting Ni-MH batteries in x series and y parallel (x and y are positive integers) will be described.

The battery controller 2 issues a warning for battery replacement to a host system when the resistance value of the secondary battery module 1 attains a predetermined threshold resistance value $R_{LS1}$. In response to this, the secondary battery module 1 is unloaded. Each unloaded secondary battery module 1 stores the battery usage history and the SOH at the point of unloading, which includes the capacity C, the resistance R, and the like.

Therefore, based on this information, the unloaded secondary battery module 1 is applied to a D' [kW] stop-idling hybrid vehicle system which functions at an internal resistance R that satisfies $R_{LS1}<R<R_{LS2}$. Then, when the internal resistance R attains a predetermined threshold $R_{LS2}$, the secondary battery module 1 is applied to confirmation of the battery performance and is then applied to a light-car hybrid system having a motor output of B' [kW] that functions at an internal resistance R that satisfies $R_{LS2}<R<R_{LS3}$.

Furthermore, when the secondary battery module 1 is used in this system and the internal resistance or other factors attains the internal resistance $R_{LS3}$ and a capacity $C_1$ defined as the thresholds, the secondary battery module 1 is disassembled and judged based on the history data including the resistance and the capacity of the module, and is applied to a battery having a voltage of 7.2 [V] and a capacity of $C_1$ [Ah] (note that $C_1 \leq C_0$), for example. Meanwhile, these batteries are appropriately reassembled and used as a battery for a 14 [V] uninterruptible power source, for example. Meanwhile, a 36 [V] power source is formed by connecting an appropriate number of the batteries in series-parallel, and is used as a power source for a movable body system such as an electric commuter car which functions at a resistance R that satisfies $R_{LS3}<R<R_{LS4}$. Meanwhile, the batteries is applied to stepping down with a DC/DC converter or the like and is used as a battery device for a 3.0 [V] emergency lamp or night-light or for a 1.2 [V] solar light, for example.

Seventh Example of an Aspect of the Embodiment

Next, an example of reusing a battery type regenerated power absorber having an average battery voltage of $V_0$ [V], a capacity of $C_0$ [Ah], and an output of E' [kW] constructed by connecting lithium-ion secondary batteries in x series and y parallel (x and y are positive integers) will be described.

The battery controller 2 issues a warning for battery replacement to a host system when the resistance value of the secondary battery module 1 attains a predetermined threshold resistance value $R_{LS1}$. In response to this, the secondary battery module 1 is unloaded. The unloaded secondary battery module 1 stores the battery usage history and the SOH at the point of unloading, the SOH including the capacity C, the resistance R, and the like. Accordingly, based on this information, the unloaded secondary battery module 1 is applied to a battery (a y1 parallel configuration) as an auxiliary power source for a household fuel cell system which functions at an internal resistance R that satisfies $R_{LS1}<R<R_{LS2}$.

Figure 12:
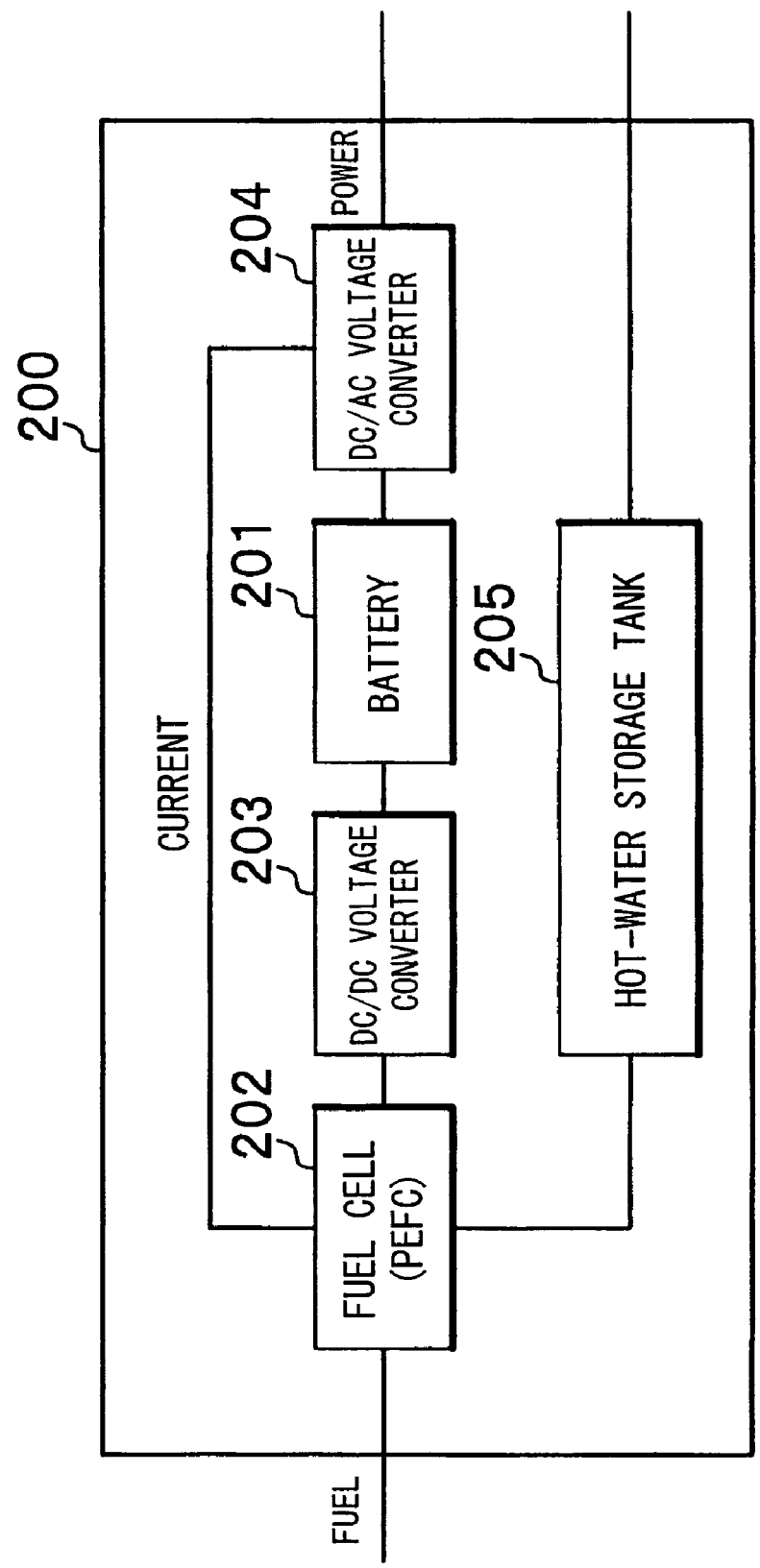
FIG. 12 is a view showing an example of a configuration of a household fuel cell system according to a seventh aspect of the embodiment of the present invention.

FIG. 12 is a view showing an example of a configuration of a household fuel cell system. As shown in FIG. 12, a household fuel cell system 200 includes a fuel cell (a polymer electrolyte fuel cell, or PEFC) 202, a DC/DC voltage converter 203, a battery 201, a DC/AC voltage converter 204 and a hot-water tank. The battery 201 is configured to absorb redundant power. In the DC/AC voltage converter 204, an inverter or the like is utilized. For the hot-water tank, waste heat is utilized. A current generated by the fuel cell 202 is converted into an alternating voltage for household use by use of the DC/AC voltage converter 204, and is supplied as household electric power.

The battery 201 absorbs and charges a redundant current out of the current outputted from the fuel cell 202 through the DC/DC converter 203 when the power supplied from the fuel cell 202 is greater than the power consumed in a house, i.e. at the time of redundant power. Meanwhile, in the case of power shortage, the battery 201 discharges the power and the output is converted into the alternating voltage for household use by use of the DC/AC converter 204 and is supplied as the household power.

For example, in the case of the household fuel cell system 200 applying the fuel cell designed for a rated output voltage of $V_F$ [V] and a rated current of $I_F$ [A], the redundant current of the fuel cell 202 is raised by the DC/DC voltage converter 203 and charged in the battery 201. Meanwhile, when the household power runs short, the output from the fuel cell 201 is converted into AC 100 [V] or 200 [V] by the DC/AC voltage converter 204 and is supplied to the house.

In the above-described household fuel cell system 200, the reused secondary battery can be applied to the battery 201. Accordingly, it is possible to suppress the price of the system. Moreover, in the household fuel cell system 200, the battery 201 functioning as the auxiliary power source can charge the redundant power. Accordingly, it is possible to supply stable power in a period from a time when the fuel cell 202 is started to a time when the fuel cell 202 settles into a steady state. Furthermore, it is possible to level off an electric load on the fuel cell 202 at a peak of a household power load. Accordingly, efficiency of the fuel cell 202 is improved, and the energy can be thus utilized more effectively.

Naturally, in the battery 201 of this household fuel cell system 200, the battery controller 2 (not shown in FIG. 12) included in the battery 201 issues a warning for battery replacement when the internal resistance or the capacity attains predetermined thresholds $R_{LS2}$ and $C_2$. Upon receipt of the warning, the battery 201 is replaced and recovered. The recovered battery 201 is applied to confirmation of the battery performance based on the history information and the like retained by the secondary battery module 1. After the confirmation of the battery performance, the recovered battery 201 is loaded on a hybrid system of a light car having a motor output of B' [kW], for example.

Furthermore, when the internal resistance or other factors of the secondary battery module 1 attains predetermined thresholds in this light car hybrid system, the secondary battery module 1 is disassembled into the cells after storing the characteristic data such as the resistance and the capacity and the history data into, for example, the battery information DB 32. Here, the cells can ensure certain performances such as a voltage of 3.6 [V] or a capacity of $C_3$ [Ah].

Several pieces of the cells are reassembled and applied to a battery for an uninterruptible power source designed for 12 to 14 [V], for example. Meanwhile, it is also possible to apply the reassembled cells to rechargeable devices including an emergency lamp, a night-light, and a solar light. Moreover, the reassembled cells are applied to a system configured to discharge a current equal to or below 0.2 [C] as a primary battery represented by a power source of a flashlight. The cells are disposed of after entirely discharged.

When the secondary battery is utilized as described above, it is possible to use inner energy of the battery more effectively to reduce the voltage at the time of disposal. Accordingly, probability of occurrence of heat generation or liquid spillage due to a short circuit is reduced and safety is also ensured at the time of disposal. In addition, by establishing this reuse system, it is possible to reduce initial investment costs of the battery and to reduce initial installation costs of the large-size battery on the part of a user.

Eighth Example of an Aspect of the Embodiment

Next, an example of reusing an F' [kW] electric vehicle battery constructed by connecting lithium-ion secondary batteries in x series will be described.

The battery controller 2 issues a warning for battery replacement to a host system when the internal resistance or the capacity of the secondary battery module 1 respectively attains a resistance value $R_{LS1}$ or a current value $C_{LS1}$, defined as thresholds. The secondary battery module 1 is replaced with a new product when there is the warning for battery replacement or at the time of an initial automobile inspection in the third year at a certain automobile maintenance shop. New battery characteristic data have been written in the battery information storage unit 17 of the replaced new secondary battery module 1. The battery controller 2 reads the new battery characteristic data and updates its own battery control program and the like when necessary in response to the battery characteristic data.

On the other hand, the battery information storage unit 17 of the unloaded secondary battery module 1 stores the information on the battery usage history in the past, and the SOH information at the point of unloading, which includes the capacity, the resistance, and the like. Accordingly, based on this information, the unloaded secondary battery modules 1 are reassembled into a configuration having serial and parallel connections of the predetermined number. The reassembled secondary battery modules 1 are then used as the battery 201 for the household fuel battery system 200 to be operated at several [kW], which can function under conditions of $R_r < R_{LS1}$ or $C_r < C_{LS1}$. At this time, the DC/DC voltage converter 203 is unnecessary in a case where the rated output voltage of the fuel cell 202 is equal to the voltage of the battery. Accordingly, it is possible to charge the redundant current without voltage conversion. Meanwhile, the output of the battery 201 is converted into AC 100 [V] by the DC/AC voltage converter 204 and is supplied to the house.

In this household fuel cell system 200 as well, the battery controller 2 included in the battery 201 issues a warning for battery replacement when the internal resistance or the capacity attains the corresponding predetermined threshold. Accordingly, the secondary battery module 1 is replaced when there is the warning for battery replacement, or after a predetermined period from starting the use of the module, for example, two years later.

In the above-described household fuel cell system 200, the battery 201 functioning as the auxiliary power source can charge the redundant power. Accordingly, it is possible to supply stable power even in a period from a time when the fuel cell 202 is started to a time when the fuel cell 202 settles into a steady state. Furthermore, since it is possible to level off an electric load on the fuel cell 202 at a peak of a household power load. Accordingly, efficiency of the fuel cell 202 is improved and the energy can be utilized more effectively.

Ninth Example of an Aspect of the Embodiment

Next, an example of reusing the secondary battery module 1 by use of the battery information management device 3 will be described. The secondary battery module 1 targeted in this example is assumed to be a battery having an average voltage of $V_1$ [V] and a capacity of $C_1$ [Ah].

The battery information storage unit 17, which stores the characteristic data, the usage history, and the like of the battery, is placed inside the housing of the secondary battery module 1. Moreover, a connection slot for a portable storage medium (see FIG. 10, corresponding to the portable storage medium storage device battery information R/W terminal 15b) is provided on a surface of the housing. Here, the portable storage medium storage device includes a magnetic or optical recording medium or a semiconductor nonvolatile memory, such as a flexible disk, a CD-ROM, a DVD, a Memory Stick (registered trademark), a Compact Flash (registered trademark) card or a USB memory.

The battery information such as the battery characteristic data or the usage history thereof stored in the battery information storage unit 17 can be read out to the above-described portable storage medium storage device and can be further registered in the battery information DB 32 of the battery information management device 3 through the portable storage medium storage device. Moreover, in a case where there is a change in the application of the secondary battery module 1 at the time of maintenance, for example, it is possible to write the characteristic data concerning battery control and the like temporarily into the portable storage medium storage device, and to update the information stored in the battery information storage unit 17 by use of the portable storage medium storage device.

As described above, it is possible to execute condition computing properly in accordance with the characteristics of the secondary battery module at that point by updating the information stored in the battery information storage unit 17 as appropriate. Therefore, it is possible to achieve highly accurate battery control and thus to use the battery properly. As a result, it is possible to improve not only reliability of the secondary battery system 7 but also reliability of the host system applying the secondary battery system 7.

Tenth Example of an Aspect of the Embodiment

Next, an example of reusing a battery type regenerated power absorber having an average voltage of $V_1$ [V], a capacity of $C_1$ [Ah], and output of A [kW] constructed by connecting batteries (lithium-ion secondary batteries or nickel-metal hydride. batteries) in x1 series and y1 parallel (x1 and y1 are positive integers) will be described.

The battery controller 2 issues a warning for battery replacement to a host system when the resistance value of the secondary battery module 1 attains the resistance value $R_{LS1}$ defined as the threshold. In response to this, the secondary battery module 1 is unloaded. The unloaded secondary battery module 1 stores the battery usage history information and the SOH information such as the capacity C or the resistance R at the point of unloading. The battery information management device then acquires the SOH information and the like from the unloaded secondary battery modules 1, and grades the secondary battery module 1 based on the information.

At this time, the battery information management device 3 includes an application system DB (not shown in FIG. 6 and the like) which stores a list of application systems for the secondary battery module 1 as well as operating conditions, thresholds, and the like of the batteries required respectively by the application systems. The battery information management device 3 then makes reference to the application system DB based on the result of grading the unloaded secondary battery module 1, and displays candidates for the new application system for the secondary battery module 1. Then, one is selected from the displayed candidates for the new application system. For example, the secondary battery module 1 is incorporated into a configuration in x2 series (x2 is a positive integer) to be applied to a hybrid car system having a motor output of B [kW].

Subsequently, the secondary battery module 1 is detached from the hybrid car system when the internal resistance or the like thereof attains the corresponding predetermined threshold $R_{LS2}$, while being used in the hybrid car system. Then, the battery information management device 3 reads the SOH information such as the capacity C and the resistance R stored in the secondary battery module 1, the battery performance and the like are confirmed. Then, the battery information management device 3 again grades the secondary battery module 1. The battery information management device 3 displays candidates for the new application system, based on the result of the grading and the application system DB. Then, one is selected from the displayed candidates for the new application system. For example, the secondary battery module 1 is applied to a light car hybrid system having a motor output D [kW], for which a resistance value $R_r$ necessary to function the system satisfies $R_{LS2} < R_r = R_{LS3}$.

Moreover, the secondary battery module 1 is gradually deteriorated, while being used in the light car hybrid system. Then, the secondary battery module 1 is detached from the light car hybrid system when the internal resistance thereof attains the threshold $R_{LS3}$. Then, the battery information management device 3 reads the SOH information such as the capacity C and the resistance R stored in the secondary battery module 1, and displays candidates for a new application after performing similar information processing as described above. As a result, the secondary battery module 1 is disassembled into cells.

At this time, the voltage of the cells is equal to $(V_1/n)$ [V] (n: the number of series) and the capacity thereof is equal to $C_2$ [Ah] (note that $C_2 < C_1$). Several pieces of the cells are reassembled and applied to a system such as an uninterruptible power source that functions under conditions of a capacity $C_r < C_2$ and a resistance $R_r > R_{LS3}$. Alternatively, the reassembled cells are applied similarly to rechargeable devices including an emergency lamp, a night-light, and a solar light as similar applications.

Moreover, the cell, which has deteriorated to have the resistance or the like lower than the corresponding threshold for the secondary battery use, is used as a primary battery represented by a power source of a flashlight. The cell is applied to a system configured to discharge a current I that satisfies $I < I_{rs}$ (the code $I_{rs}$ denotes the maximum current values when applied to the respective systems) as the primary battery. Then, the cell is disposed of after entirely discharged.

When the secondary battery module 1 is utilized as described above, it is possible to use inner energy of the battery more effectively and thus to reduce the voltage at the time of disposal. Accordingly, probability of occurrence of heat generation or liquid spillage due to a short circuit is reduced and safety is also ensured at the time of disposal. In addition, by establishing this reuse system, it is possible to reduce initial investment costs of the battery and to reduce initial installation costs of the large-size battery on the part of a user.

Eleventh Example of an Aspect of the Embodiment

Next, an example of a battery sales service system, to which the battery information management system 8 (8a) shown in FIG. 6 or FIG. 11 is applied, will be described.

In this specification, the secondary battery or the battery means a chargeable and dischargeable battery including secondary batteries such as a lead-acid battery, a nickel-metal hydride battery and a lithium-ion battery, an electric double layer capacitor, an ultracapacitor, and the like. Usually, the secondary battery or the battery means an assembled battery formed by connecting a plurality of these cells. These secondary batteries are sold by the battery manufacturer P1 to the system manufacturer P2, which is a primary user, for example, an automobile manufacturer which purchases the secondary batteries and incorporates them into products.

Then, a system product such as an automobile incorporating the secondary batteries is purchased by the end user P3 who is a secondary user.

The secondary battery incorporated in a system product such as an automobile is gradually deteriorated while being used by the end user P3. Accordingly, the secondary battery controller 2 included in the secondary battery system 7 stores the usage history and the electrical characteristic data of the secondary battery in the battery information storage unit 17 of the secondary battery module 1. At the same time, the secondary battery controller 2 checks whether or not the characteristic data attain predetermined thresholds. When the characteristic data attain the predetermined thresholds, the secondary battery controller 2 notifies a warning for battery replacement to a host system such as the navigation device 61.

In the meantime, the system manufacturer P2 or the battery maintenance service agency P4 assigned by the system manufacturer P2 receives information on the secondary battery modules 1 sold to the system manufacturer P2 by the battery manufacturer P1 accumulates the information in the battery information DB 32 of the battery information management device 3. The information includes product identification number and the electrical characteristic data and the like. Meanwhile, the battery maintenance service agency P4 checks the usage history and the electrical characteristic data stored in the battery information storage unit 17 of the secondary battery module 1 at the time of a periodic check or inspection of the automobile, for example. The battery maintenance service agency P4 then judges the battery condition of the secondary battery module 1, and offers services that include the rewriting of the battery control characteristic data for optimization by way of maintenance and repair.

Moreover, the battery maintenance service agency P4 recovers and unloads the secondary battery module 1, for example, upon receipt of notification of a warning for battery replacement from the end user P3 through the host system such as the navigation device 61 and the communications network 5 or upon receipt of similar notification by a telephone call or when the battery maintenance service agency P4 recognizes a necessity of battery replacement at the time of a maintenance service.

The unloaded secondary battery module 1 is caused to undergo a prescribed process for confirming the battery usage history and the like, and the information on the battery usage history and the electrical characteristic data are registered in the battery information DB 32 of the battery information management device 3. Thereafter, the secondary battery module 1 is returned from the battery maintenance service agency P4 to the battery manufacturer P1.

The battery manufacturer P1 makes reference to the battery information DB 32 through the terminal device 4 to acquire the information on the battery usage history and the electrical characteristic data of the returned secondary battery module 1. Then, the battery manufacturer P1 sorts and grades the secondary battery module 1 based on the information. Thereafter, based on a result of the grading and on the application system DB (the unillustrated DB included in the battery information management device 3) which stores the list of the application systems for the secondary battery module 1 and the operating conditions, the thresholds required by the corresponding application systems and the like, the battery manufacturer P1 resells the secondary battery module 1 to another system manufacturer P2.

The battery manufacturer P1 repeats the resale of the secondary battery module 1 by means of the similar procedure, which is returned and resold. Then, in a case where it is no longer possible to resell the secondary battery module 1 in the similar manner, due to deterioration thereof, the secondary battery module 1 is applied to a primary battery application, and is then processed for disposal by the waste disposer P6 after fully discharged. Alternatively, after disassembling the secondary battery module 1 into the cells, the cells are reassembled into another secondary battery for other applications. After the secondary battery is used, the battery is fully discharged in the primary battery application, and is processed for disposal by the waste disposer P6. Here, the disposal process is conducted by the prescribed waste disposer P6, and the secondary battery to be disposed is caused to undergo crushing and separation processes, and is then separated into recyclable materials and waste residue.

As described above, it is possible to reduce market prices of secondary batteries by repeatedly recovering, reselling, and fully utilizing the secondary battery module 1.

What is claimed is:

1. A secondary battery module comprising:
an assembled battery formed by connecting a plurality of cells;
a battery information storage means for storing as battery information at least one of electrical characteristic information and usage history information on the secondary battery module or the assembled battery;
first communications interface means, which is provided as a connection unit to which a battery controller that executes battery control by acquiring the battery information is connectable, and which when connected to the battery controller, functions to send the battery information stored in the battery information storage means to the battery controller, and also to receive the battery information outputted from the battery controller and send the received battery information to the battery information storage means;
second communications interface means for sending and receiving the battery information;
a control circuit for controlling reading and writing of the battery information from and into the battery information storage means; and
a housing, which houses the assembled battery, the battery information storage means, and the control circuit, and on which the first and second communications interface means are provided,
wherein the second communications interface means is provided as a connection unit to which an external device that handles information that is necessary for reuse of the secondary battery module is connectable, the second communications interface means functions to send to the external device and as information that is necessary for reuse of the secondary battery module the battery information stored in the battery information storage means when it is detected that the battery controller is separated from the secondary battery module and the external device is connected, and the second communications interface means functions to receive as information to be stored in the battery information storage means the battery information that is outputted from the external device and to send the received battery information to the battery information storage means when the secondary battery module is to be reused and the external device is connected, and
wherein the control circuit functions to read from the battery information storage means the battery information stored in the battery information storage means when the battery information stored in the battery information storage means is to be sent to the second communications interface means, and the control circuit functions to, when the battery information is sent to the battery information storage means from the second communications interface means, write into the battery information storage means the battery information that is sent to the battery information storage means.

2. The secondary battery module according to claim 1, wherein the battery information storage means is configured to be included in a radio frequency identification tag.

3. The secondary battery module according to claim 1, wherein the external device comprises a portable storage medium storage device storing the battery information.

4. The secondary battery module according to claim 3, further comprising:

a first switch for instructing, when the battery controller is separated from the secondary battery module and the portable storage medium storage device is connected to the second communications interface means, an operation for reading from the battery information storage means the battery information that is stored in the battery information storage means and that is to be sent to the portable storage medium storage device; and a second switch for instructing, when the secondary battery module is reused and the portable storage medium storage device is connected to the second communications interface means, an operation for writing into the battery information storage means that battery information that is stored in the portable storage medium storage device and that is to be stored in the battery information storage means, wherein the first and second switches are provided on the housing.

5. The secondary battery module according to claim 1, wherein:

the second communications interface means includes password judging means for judging whether or not an inputted password is a predetermined password, and one of a reading operation for reading the battery information from the battery information storage means and a writing operation for writing the battery information into the battery information storage means is validated when the password judging means judges that the inputted password is the predetermined password, and one of the reading operation for reading the battery information from the battery information storage means and the writing operation for writing the battery information into the battery information storage means is invalidated when the password judging means judges that the inputted password differs from the predetermined password.

* * * * *